US008515781B2

(12) United States Patent
Kaehler et al.

(10) Patent No.: US 8,515,781 B2
(45) Date of Patent: Aug. 20, 2013

(54) BENEFIT MANAGEMENT

(75) Inventors: Peter J. Kaehler, Hudson, WI (US); John L. Erickson, Plymouth, MN (US); Leonard R. Steidel, Prior Lake, MN (US); Peter L. Hauser, Lakeville, MN (US)

(73) Assignee: Peter L. Hauser, Fountain Hills, AZ (US)

( * ) Notice: Subject to any disclaimer, the term of this patent is extended or adjusted under 35 U.S.C. 154(b) by 659 days.

(21) Appl. No.: 12/421,397

(22) Filed: Apr. 9, 2009

(65) Prior Publication Data

US 2009/0204448 A1  Aug. 13, 2009

Related U.S. Application Data

(63) Continuation of application No. 10/687,223, filed on Oct. 15, 2003.

(51) Int. Cl.
*G06Q 10/00* (2012.01)
*G06Q 50/00* (2012.01)
*G06Q 40/00* (2012.01)

(52) U.S. Cl.
USPC .................................... 705/3; 705/2; 705/4

(58) Field of Classification Search
USPC ...................................................... 705/2–4
See application file for complete search history.

(56) References Cited

U.S. PATENT DOCUMENTS

| 5,655,085 | A |  | 8/1997 | Ryan et al. |
|---|---|---|---|---|
| 5,724,379 | A |  | 3/1998 | Perkins et al. |
| 5,802,500 | A |  | 9/1998 | Ryan et al. |
| 5,832,447 | A |  | 11/1998 | Reiker et al. |
| 5,890,129 | A |  | 3/1999 | Spurgeon |
| 6,014,632 | A |  | 1/2000 | Gamble et al. |
| 6,044,352 | A | * | 3/2000 | Deavers .............................. 705/4 |
| 6,208,973 | B1 | * | 3/2001 | Boyer et al. ...................... 705/2 |
| 6,735,569 | B1 |  | 5/2004 | Wizig |
| 6,820,558 | B2 | * | 11/2004 | Haak et al. .................... 102/283 |
| 6,826,541 | B1 |  | 11/2004 | Johnston et al. |
| 6,873,959 | B2 | * | 3/2005 | Wood et al. ....................... 705/4 |
| 7,174,302 | B2 |  | 2/2007 | Patricelli et al. |
| 2002/0049617 | A1 | * | 4/2002 | Lencki et al. ..................... 705/4 |
| 2002/0069090 | A1 |  | 6/2002 | De Grosz et al. |
| 2002/0128879 | A1 |  | 9/2002 | Spears |
| 2002/0198831 | A1 | * | 12/2002 | Patricelli et al. ................ 705/40 |
| 2003/0065534 | A1 |  | 4/2003 | McCartney |

(Continued)

OTHER PUBLICATIONS

Federal Information and News Dispatch, "Third Party Collections and Third Party Liability/Medical Affirmative Claims Program", Commerce Business Daily, Apr. 30, 2001, p. 1.*

(Continued)

*Primary Examiner* — Jason Dunham
*Assistant Examiner* — Amber A Misiaszek
(74) *Attorney, Agent, or Firm* — Brooks, Cameron & Huebsch, LLC

(57) ABSTRACT

Methods, devices and systems are provided for benefit management. One system includes a server including an application interface and access to a data store having one or more client files. A client file can include a definable set of business rules for managing and administering benefits and can include fund use rules for accessing and applying funds to claims from one or more accounts. The system includes a program operable on the server to apply the definable set of business rules in connection with processing a claim.

20 Claims, 12 Drawing Sheets

(56) References Cited

U.S. PATENT DOCUMENTS

| | | |
|---|---|---|
| 2003/0120511 A1 | 6/2003 | Legnini |
| 2003/0149596 A1 | 8/2003 | Bost |
| 2003/0187695 A1* | 10/2003 | Drennan .......................... 705/2 |
| 2003/0204469 A1* | 10/2003 | Combs ........................... 705/39 |
| 2004/0059626 A1 | 3/2004 | Smallwood |
| 2004/0103002 A1 | 5/2004 | Colley et al. |
| 2004/0128172 A1 | 7/2004 | Van Cleave et al. |
| 2004/0249719 A1 | 12/2004 | Urpani |
| 2005/0149359 A1 | 7/2005 | Steinberg et al. |
| 2005/0182659 A1 | 8/2005 | Huttin |
| 2005/0182660 A1 | 8/2005 | Henley |
| 2005/0286709 A1 | 12/2005 | Horton et al. |

OTHER PUBLICATIONS

United States Patent and Trademark Office Office Action for U.S. Appl. No. 10/687,223 dated Jan. 25, 2008 (16 pgs).

Amendment and Response for U.S. Appl. No. 10/687,223 dated Apr. 17, 2008 (12 pgs).

United States Patent and Trademark Office Final Office Action for U.S. Appl. No. 10/687,223 dated Jul. 18, 2008 (27 pgs).

Appeal Brief for U.S. Appl. No. 10/687,223 dated Sep. 19, 2008 (40 pgs).

United States Patent and Trademark Office Examiner's Answer for U.S. Appl. No. 10/687,223 dated Dec. 9, 2008 (20 pgs).

Reply Brief for U.S. Appl. No. 10/687,223 dated Jan. 22, 2009 (17 pgs).

* cited by examiner

SPONSOR CLAIM CATEGORY

| | | CO-PAY | | |
|---|---|---|---|---|
| 501 { SPONSOR PAYS PERCENTAGE | | ●~502 | 50% | ~504 |
| SPONSOR PAYS FIXED AMOUNT | | ○~506 | $45 | ~508 |

| | | | SPONSOR RULE | MEMBER RULE |
|---|---|---|---|---|
| 503 { MEMBER ACCOUNT RULES | | | | |
| HRA | 522~ | 2 | ●~510 | ○~512 |
| FSA | 524~ | 4 | ●~514 | ○~516 |
| MEMBER OUT OF POCKET | 526~ | 6 | ○~518 | ●~520 |

| | | CO-INS | | |
|---|---|---|---|---|
| 505 { SPONSOR PAYS PERCENTAGE | | ●~528 | 50% | ~530 |
| SPONSOR PAYS FIXED AMOUNT | | ○~532 | $45 | ~534 |

| | | | SPONSOR RULE | MEMBER RULE |
|---|---|---|---|---|
| 507 { MEMBER ACCOUNT RULES | | | | |
| HRA | 546~ | 2 | ●~536 | ○~538 |
| FSA | 550~ | 4 | ●~540 | ○~542 |
| MEMBER OUT OF POCKET | 552~ | 1 | ○~544 | ●~546 |

*Fig. 5*

| | 601-1 | 601-N | 699 |
|---|---|---|---|
| INSURANCE CATEGORY | IN NETWORK | ... | OUT OF NETWORK |
| INSURANCE RULES | INSURANCE (AFTER CO-PAY) | | INSURANCE (AFTER CO-PAY) |
| CARRIER PERCENT AFTER CO-PAY | 80% ~602 | | 50% ~604 |
| CO-PAY | $15 ~606 | | $40 ~608 |
| AFTER DEDUCTIBLE | NO ~610 | | YES ~612 |
| MAXIMUM OUT OF POCKET PAYMENT | $5,000 ~614 | | |
| SPONSOR RULES | | | |
| 601 { SPONSOR PAYS PERCENTAGE | CO-PAY: ● 616   50% ~618 | | CO-PAY: ○ 620   50% ~622 |
|      SPONSOR PAYS FIXED AMOUNT | ○ 624   $45 ~626 | | ○ 628   $45 ~630 |
| 603 { MEMBER ACCOUNT RULES | SPONSOR RULE  MEMBER RULE | | SPONSOR RULE  MEMBER RULE |
|      HRA | 643→ 2 ● 631   ○ 632 | | 2 ○ 633   ○ 634 |
|      FSA | 644→ 4 ● 635   ○ 636 | | 4 ● 637   ○ 638 |
|      MEMBER OUT OF POCKET | 645→ 6 ○ 639   ○ 640 | | 6 ○ 641   ○ 642 |
| 605 { SPONSOR PAYS PERCENTAGE | CO-INS: ○ 650   50% ~652 | | CO-INS: ○ 654   50% ~656 |
|      SPONSOR PAYS FIXED AMOUNT | ● 658   $100 ~660 | | ○ 662   $45 ~664 |
| 607 { MEMBER ACCOUNT RULES | SPONSOR RULE  MEMBER RULE | | SPONSOR RULE  MEMBER RULE |
|      HRA | 683→ 2 ● 671   ○ 672 | | 0 ● 673   ○ 674 |
|      FSA | 684→ 4 ● 675   ○ 676 | | 0 ● 677   ○ 678 |
|      MEMBER OUT OF POCKET | 685→ 0 ○ 679   ○ 680 | | 6 ○ 681   ● 682 |

*Fig. 6*

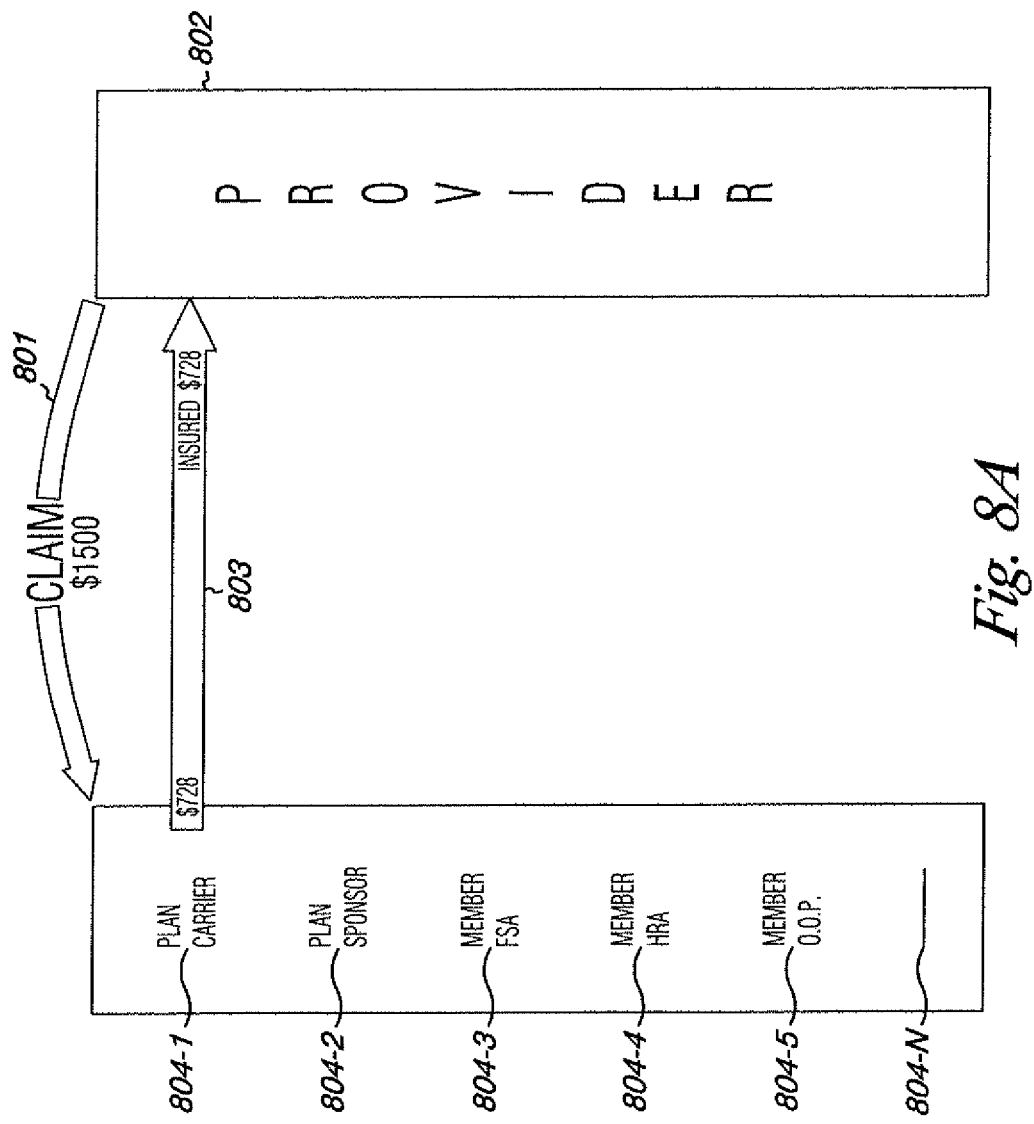

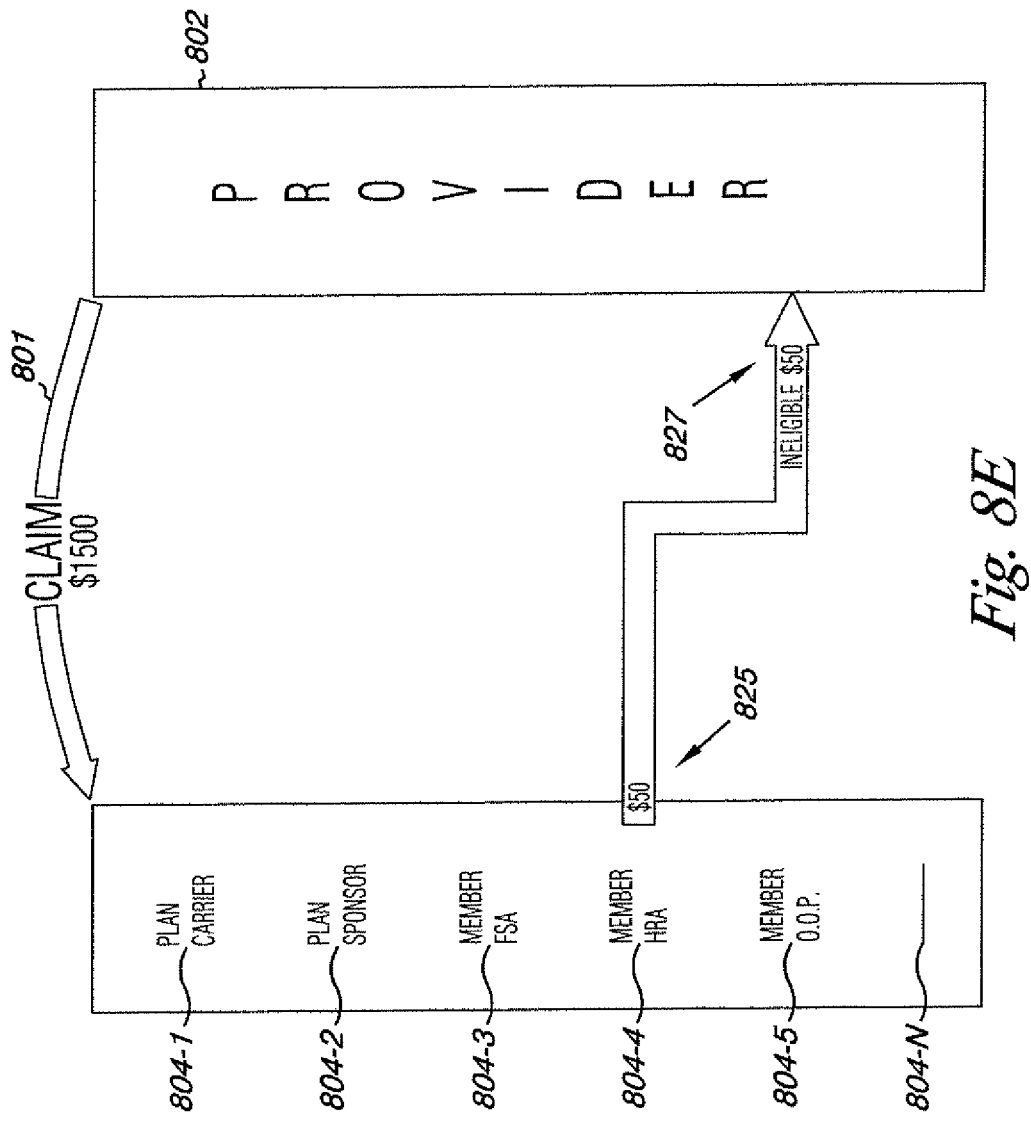

BENEFIT MANAGEMENT

PRIORITY INFORMATION

This application is a Continuation of U.S. patent application Ser. No. 10/687,223 filed Oct. 15, 2003, the specification of which is incorporated by reference herein.

INTRODUCTION

In the health care field, health and medical services are performed by medical providers, e.g., doctors, nurses, hospitals, and health care clinics. The financial costs of such health and medical services can be significant. Accordingly, many individuals elect to have health care insurance coverage through a particular health care insurer, e.g., BlueCross/BlueShield. Oftentimes, the health care insurance coverage can be obtained through an individual's employer. In this role, the employer can be referred to as the health plan sponsor and the individual insured employees can be referred to as plan participants and/or plan members.

Generally the employer or plan sponsor elects what type of health care plan will be offered to the employees and employee family members of an organization. This can include choosing the range of health care providers that will be available to plan members under the plan. The plan sponsor can further select what types of services will be included under the plan, e.g., preventive care services, office visits, hospital services, urgent care services, emergency room services, prescription drug coverage, mental health and substance related disorder services, prosthetic device coverage, home health care services, and skilled nursing facility services, to name a few. For each type of service the plan sponsor can select between plan structures for different premium payment levels, part of which may be paid by a sponsor (e.g., employer), co-payment (co-pay) amounts, deductible levels (e.g., calendar year deductibles), insured dollar coverage amounts including maximum lifetime benefit dollar amounts, and maximum member (e.g., employee) out-of-pocket per calendar year dollar amounts. These amounts can further be set based on whether a plan member has a particular service performed within a defined network of health care providers ("In-Network" providers) or outside of the defined network of health care providers ("Out-of-Network" providers). The health care insurer may offer the above choices according to a number of different health care plan options, with different associated premium levels, from which the plan sponsor can select to provide benefits that make economic sense for the sponsor's organization.

Typically, a plan member exercises what services they will use and when to use them. According to various plans, covered services, such as a doctor office visit may only require a small out-of-pocket co-pay, e.g., $10-15, from the plan member per visit. To the plan member such a cost may seem insignificant. The actual costs of the professional services provided at the doctor office visit, however, are often not insignificant. The costs of the covered services and frequency with which they are used translate into the associated premiums that are paid for each plan member to participate in the health care plan. In some instances a large percentage of health insurance premium is covered by the employer as part of the health care benefit offered to the employees. In these cases, an employee will not likely sense a true financial impact of the cost of the medical services. As such, the employee may solicit such medical services more liberally than if they had to actually pay the true cost for those services out of their own pocket with after tax dollars each time a medical service was rendered.

Health care benefits are one example of benefits that an employer can offer to employees. Other employment benefits within an employment package can include flexible spending accounts (FSAs), retirement accounts, vacation accounts, parking accounts, fitness club accounts, and salon accounts, among others.

BRIEF DESCRIPTION OF THE DRAWINGS

FIG. 5 is an embodiment representing a definable set of benefit rules for benefits management.

FIG. 6 is another embodiment representing a definable set of benefit rules for benefits management.

FIGS. 8A-8E diagram an embodiment for adjudication of a benefit claim.

DETAILED DESCRIPTION

Figure 1:
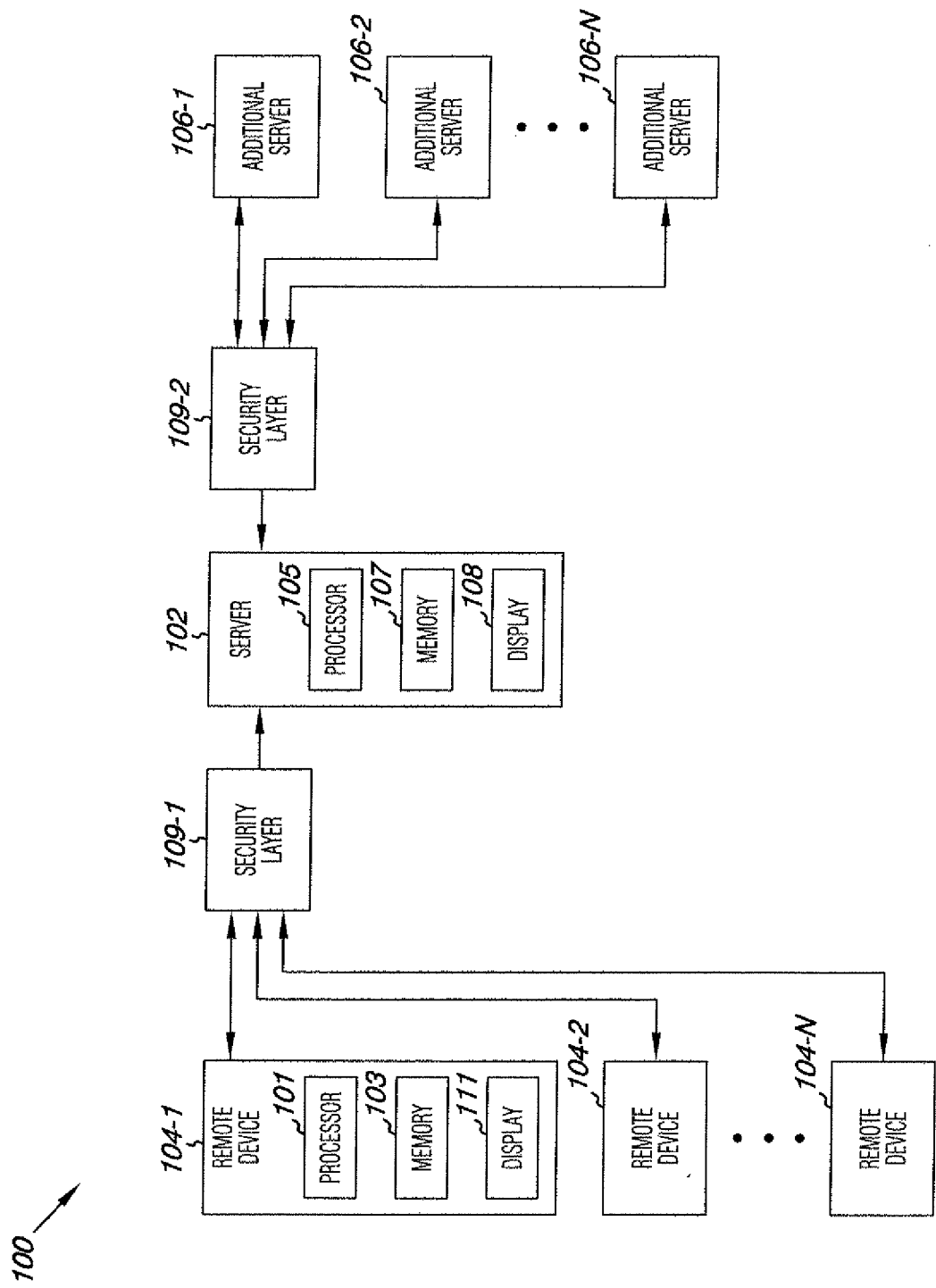
FIG. 1 is an illustration of a system embodiment according to the teachings of the present invention.

FIG. 1 is an illustration of a system 100 embodiment according to the teachings of the present invention. The system 100 includes a network system 100. The system shown in the embodiment of FIG. 1 includes a server 102. Although the term server is used herein, embodiments of the invention are not limited to implementation on such a device. It is intended that server 102 can be replaced by another computing device environment, such as a mainframe computing system or otherwise. Server 102 includes a processor 105 coupled to a memory 107 and a display 108. Processor 105, memory 107, and display 108 can include any type of processor, memory, and display capability in the art of computing. For example, memory can include Non-Volatile (NV) memory (e.g. Flash memory), RAM, ROM, magnetic media, and optically read media and includes such physical formats as memory cards, memory sticks, memory keys, CDs, DVDS, hard disks, and floppy disks, to name a few. The embodiments of the invention are not limited to any particular type of memory medium and are not limited to where within a device or networked system a set of computer instructions reside for use in implementing the various embodiments of invention. Memory can include a Direct Access Storage Device (DASD) or be located on another peripheral device that is accessible over a network. One of ordinary skill in the art will understand the many in which such memory can include data stores, software (e.g., computer executable instructions), and the like. The server 102 can be connected to a number of additional devices 104-1, 104-2, . . . , 104-N, such as remote computing devices. The designator "N" as used herein is intended to represent any number of additional devices, components, or entities being discussed. The remote devices 104-1, 104-2, . . . , 104-N can similarly include processor 101, memory 102, and display 111 capabilities. The server 102 and/or remote devices 104-1, 104-2, . . . , 104-N are capable of including programs, or software (e.g., computer executable instructions) to cause a server 102 or other device 104-1, 104-2, . . . , 104-N to perform particular functions as described in more detail below. As shown in the embodiment of FIG. 1, devices 104-1, 104-2, . . . , 104-N can couple to the server 102 through a first security layer 109-1, or secure data network 109-1. Devices 104-1, 104-2, . . . , 104-N can couple to the server 102 over a local area network (LAN), e.g. an Ethernet network. The devices 104-1, 104-2, . . . , 104-N can also couple to the server 102 over a wide area network (WAN), over the public switched telephone network (PSTN) and/or the Internet using transmission control protocol/internet protocol (TCP/IP). Networks, as used herein, can include wireless networks as can be accessed by cell phones, multifunction devices (PDAs), and the like. Wireless networks can include Global System for Mobile communications (GSM) networks, American National Standards Institute (ANSI) networks, Public Wireless Local Area Networks (PWLANs) including Wi-Fi. Thus, devices described herein can be coupled in either direct hardwired fashion, e.g. using copper, coaxial cable, optical fiber connections, and hybrid fiber-coax connection, and/or indirectly in a wireless fashion using remote electromagnetic signal transmission in the radio or microwave frequencies, e.g., RF.

The system 100 illustrates that the above described components can couple to additional servers and systems, 106-1, 106-2, . . . , 106-N, over a network as the same has been described above. Such additional servers and systems, 106-1, 106-2, . . . , 106-N, can be maintained by other organizations, or entities. The additional servers and systems, 106-1, 106-2, . . . , 106-N, can include core data stores accessible by the server 102 according to definable access rights. The additional servers and systems, 106-1, 106-2, . . . , 106-N, can include databases and executable instructions or programs to operate on data and can possess processing and routing capabilities over a PSTN or other network as described above. The additional servers and systems, 106-1, 106-2, . . . , 106-N, can include proprietary databases, data modules, and software systems maintained by third party and the like. As shown, the additional servers and systems, 106-1, 106-2, . . . , 106-N, can be coupled to the server 102 through a second security layer 109-2, or secure data network 109-2 such that data from the additional servers and systems, 106-1, 106-2, . . . , 106-N, can be securely exchanged with the server 102.

The server 102, the number of remote devices 104-1, 104-2, . . . , 104-N, and the additional servers and systems, 106-1, 106-2, . . . , 106-N, can all include computer readable medium having computer-executable instructions. As mentioned above, these computer readable medium include such devices as a disk drive for reading data storage media, e.g. a compact disc, and/or computer readable medium such as random access memory (RAM) and read only memory (ROM), non-volatile, optical, or any other type of memory storage medium.

Figure 2:
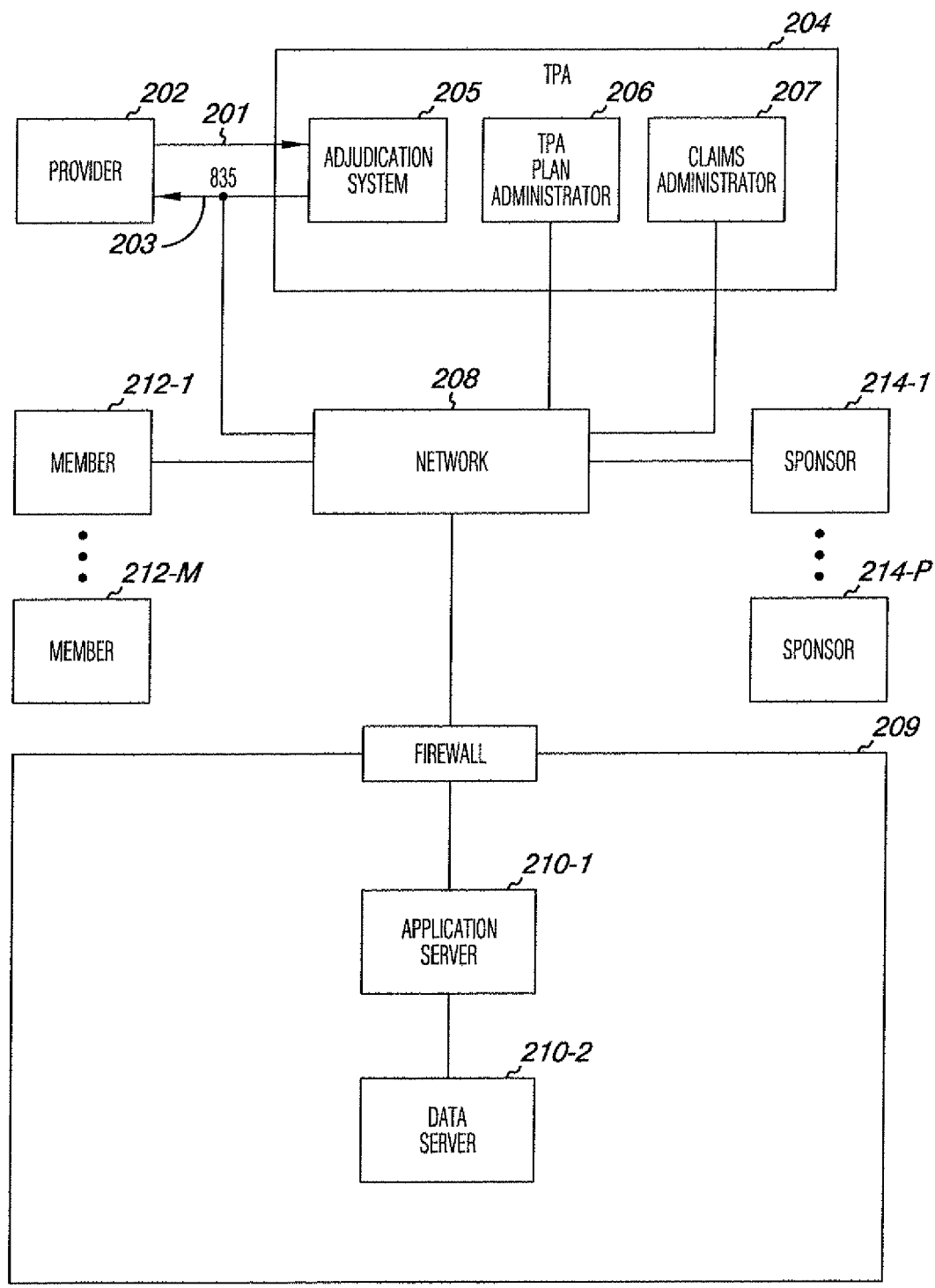
FIG. 2 is another illustration of a system embodiment according to the teachings of the present invention.

FIG. 2 is another illustration of a system embodiment according to the teachings of the present invention. In the embodiment of FIG. 2, a provider block is illustrated as 202. The provider can include a remote device or remote client, shown as 104-1, 104-2, . . . , 104-N, in FIG. 1. The provider 202 can be associated with an entity rendering a health or medical service, e.g., doctors, nurses, hospitals, and health care clinics.

When an individual goes to a provider, e.g., block 202, to receive health or medical services the provider will generally first ascertain whether the individual has health care insurance and typically require proof of the same, e.g., in the form of producing a health care insurance card. The health care insurance card will likely contain information as to the individual's health care coverage. The health care insurance card may not itself signify or define membership in a health care plan, but will likely provide some information that can be used by providers to determine eligibility (e.g., authentication, validation, etc.) for a particular type of service at the time of service. For example, the health care insurance card may contain information that can be used by a provider to determine eligibility by placing a telephone call to a call center, including a call center having interactive voice response (IVR), and/or by using an online or browser based internet inquiry. A health care insurance card can include a "smart card" having electronic information encoded thereon such as a debit card or Radio Frequency Identification (RFID) card as the same will be known and understood by one of ordinary skill in the art. As one of ordinary skill in the art will appreciate upon reading this disclosure, an eligibility determination can be performed at the time a service is performed and at a time when a claim arrives for adjudication or processing. These eligibility determinations can be different. That is, one eligibility may suffice to authorize performance of a service and another may determine eligibility from one particular payment source or another.

Depending on the type of service related to the visit and type of health care coverage provided by a given individual's health care plan, e.g., insurance plan, the individual may have to make a co-payment as part of the visit. If the individual is covered by a particular health care plan for the particular type of service, the provider will often perform the service and then submit a bill for the service directly to the health care insurer according to a business arrangement under the health care plan and with the health care insurer.

In the embodiment of FIG. 2, the provider 202 is illustrated as electronically submitting a claim 201, for payment of the medical service, e.g., "claim request", to an entity working in the role of claim processing. By way of example and not by way of limitation, this entity can include a person in a human resources (HR) department of a company, it can include a department or individual in the health care insurer itself, and/or it can include a third party administrator (TPA) 204 working on behalf of the health care insurer. Embodiments of the invention are not so limited. Also, although the embodiment of FIG. 2 shows as an electronic exchange of data, embodiments of the invention are not limited to the electronic exchange of data.

In the embodiment of FIG. 2, the submitted claim 201 can be processed by the TPA 204, or other entity. For example, the electronic submission of medical information including claim information can be made in accordance and/or compliance with the Health Insurance Portability and Accountability Act (HIPAA). However, embodiments of the invention are not limited to implementation with HIPAA. By way of example, a TPA 204 can have a software system 205 in place for processing the submitted claim 201. This process of reviewing and approving and/or denying partial or full payment of a claim is commonly referred to as an "adjudication" of the claim. The process, referred to hereafter as "adjudication system" 205 can include manual, software, firmware, and/or hardware components and/or some combination thereof which is capable of processing the validity, format, and accuracy of the claim 201 for payment to the provider 202 according to the business arrangement terms of the health care plan. Business arrangement terms are typically negotiated in advance between health care insurers, or other plan entities, referred to herein as "Plan Carriers", and the medical providers. The business arrangement terms establish whether a given provider is considered in the network ("In-Network") or out of the network (Out-of-Network) for a given health care plan.

In the medical industry, software adjudication systems, such as adjudication system 205, are available which provide a routine for the submission and approval process of claims from a provider 202 to a TPA 204, or other processing entity, and established mechanisms for coordinating payment to the provider 202 for the services. Such software can reside on a server, such as server 102 and/or additional servers 106-1, . . . , 106-N, mainframes, and/or other computing environments, distribute or otherwise. Embodiments are not so limited. For example, according to one particular routine, an electronic request 201 that is sent from the provider 202 to the TPA 204 can be referred to as a Health Care Claim Transaction Set (also referred to as a "837"). The response, which could include payment from the TPA 204 to the provider 202 can be referred to as a Health Care Claim Payment/Advice (also referred to as a "835"). These transactions are part of the American National Standards Institute (ANSI) ASC X12N Standard. ANSI ASC X12N standards have been adopted under the Health Insurance Portability and Accountability Act of 1996 (P.L. 104-191 also known as "HIPAA"). Embodiments of the invention, however, are not limited to this example. That is, embodiments of the invention are not limited to implementation and/or compliance with HIPAA or ANSI ASC X12N standards.

As shown in the embodiment of FIG. 2, the claim 201 is submitted to the TPA 204, or other processing entity, as a claim request. Once the submitted claim 201 has been appropriately processed, e.g., adjudicated by the adjudication system 205, a result in the form of a "claim response" 203 can be returned to the provider 202. The claim request and reply can be exchanged electronically. However, embodiments are not limited to an electronic exchange. As shown in FIG. 2, the TPA 204, or other processing entity, can include one or more plan or claim administrator(s), shown as 206 and 207 respectively. The plan and/or claim administrator(s) 206 and 207 can have access to additional third party systems as the same have been described in connection with FIG. 1. In FIG. 2, the plan or claim administrator 206 and 207 is illustrated as having electronic access to other entities via a network 208. The same is not, however, required. As explained in connection with FIG. 1, the network 208 can include a local area network (LAN), e.g. an Ethernet network a wide area network (WAN), a network including the public switched telephone network (PSTN) and/or the Internet using transmission control protocol/Internet protocol (TCP/IP). These networks can include wireless networks as can be accessed by cell phones, multifunction devices (PDAs), and the like. Wireless networks can include Global System for Mobile communications (GSM) networks, American National Standards Institute (ANSI) networks, and Public Wireless Local Area Networks (PWLANs) including Wi-Fi, among others. Embodiments are not limited to these examples. As one of ordinary skill in the art will appreciate upon reading this disclosure, the TPA's 204, or other processing entity's plan and/or claim administrator(s) 206 and 207 can process and/or provide appropriate information to additional third parties with appropriate access rights to given claim administration work, e.g., a plan member, plan carrier, and/or plan sponsor.

As shown in FIG. 2, embodiments of the present invention provide a process and, in some embodiments, a software implemented program which can conjunctively work with the post-adjudicated claim responses from a TPA 204 or other processing entity to define relationship rules associated with benefits administration. According to various embodiments, post-adjudicated claims are placed into a manual and/or electronic post adjudication system 209. For purposes of discussion, the post-adjudication system 209 is referred to in terms of an electronic and software driven system. However, embodiments are intended to include manual implementation.

In the embodiment shown in FIG. 2, post-adjudicated claims or claim responses to providers 202 can also be received by the post adjudication system 209 for implementing post-adjudicated claim rule sets. In various embodiments, the system 209 includes programs to allow a plan sponsor to establish additional rules sets, e.g., after insurance rule sets, as to the manner in which certain benefit accounts of a plan member are utilized in connection with a service. Embodiments, however, include the establishment of rule sets, described herein, in other than electrical, electronic, and software implementations. In various embodiments, the "service" is associated with a health care claim. However, embodiments are not so limited. Although health care services are described throughout the present document, the techniques described herein can be applied to the management and administration of any number and type of benefit and/or sponsor, member, or other account type. According to various embodiments described herein, rule sets can be cascaded down from a plan carrier to a plan sponsor to a plan member. Examples will be described in more detail below.

As shown in FIG. 2, the post-adjudicated claim response, e.g., an "835 claim response" 203 can be received by the system 209 electronically. As noted above, embodiments of the invention are not so limited. In the embodiment of FIG. 2, the post-adjudicated claim response 203 is illustrated as being received electronically by the system 209 via the network 208. In this example, programs within the system 209 can receive a stream of adjudicated claim data. As one of ordinary skill in the art will appreciate upon reading this disclosure, program embodiments associated with system 209 can be added onto in complement or interaction with the TPA's 204, or processing entity's system, e.g., connected as part of a LAN or WAN, or otherwise. Alternatively, program embodiments associated with system 209 can be resident on a separate entity's system, e.g., additional server systems 106-1, . . . , 106-N coupled over the PSTN, Internet or otherwise, and be managed by an entity other than the particular TPA or processing entity shown as 204. Embodiments of the invention are not so limited.

The embodiment of FIG. 2 illustrates an application server 210-1 on which programs for receiving the adjudicated claim data can reside. Application server 210-1 can include a server such as server 102 and/or servers 106-1, . . . , 106-N as described in connection with FIG. 1. As noted above, embodiments of the invention are not limited to a server computing environment. As shown in FIG. 2, the application server 210-1 can be coupled to a data server 210-2. Data server 210-2 can be representative of one of the additional servers 106-1, . . . , 106-N shown in FIG. 1. Again, embodiments, however, are not limited to any particular operating and/or network environment or server configuration. The description included herein is provided for purposes of illustration.

Data server 210-2 can have restricted access to allow access only to authorized individuals, e.g., authorized administrators, of the post adjudication system 209. The data server 210-2 can track and maintain records on the handling of all post adjudicated claims. Any number of servers and/or programs can be distributed as part of the post adjudication system 209. A server, as the same or other computing environment has been described herein, is capable of maintaining a data store, having one or more client files, on a memory medium. As used herein, a client file can include a plan sponsor client file, an insurer client file, and/or a plan member client file, among others. For example, a server can include a data store that can include a number separate partitions to store data and programs for different plan sponsors. e.g., employers such as GM, Ford, IBM, etc., and for each include therein definable business rule sets for managing and administering benefits among the plan members, e.g., employees, of the plan sponsor according to the program embodiments described herein. As described in more detail below, the definable set of business rules for managing and administering benefits can include fund use rules for accessing and applying funds to claims from one or more accounts, e.g., including a health reimbursement arrangement (HRA) accounts.

Figure 3:
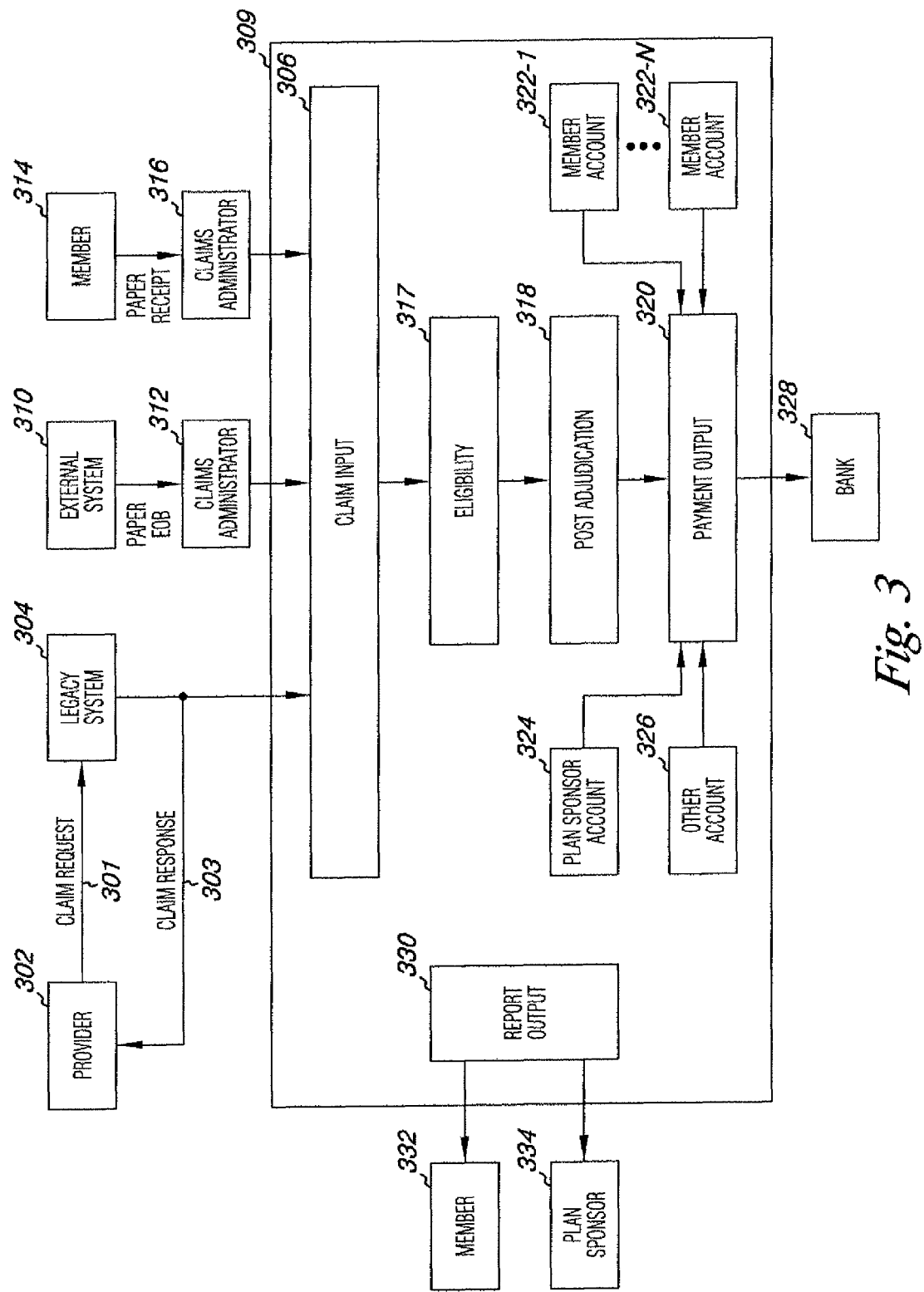
FIG. 3 is a block diagram embodiment representing a processing flow for a health care claim.

FIG. 3 is a block diagram embodiment representing, a processing flow for a health care claim. As shown in the embodiment of FIG. 3, a provider 302 sends a claim request 301 to an adjudication system 304, e.g., an adjudication system administered by a TPA or other processing entity as the same has been described in connection with FIG. 2. An electronically transmitted claim can include a number of data elements. By way of example and not by way of limitation, the data elements can include a name of the individual for whom a service was provided, a gender identifier, other reference identifiers (ID), a date of service, a type of service identifier, a location identifier of where and by whom the service was performed, and a charge identifier for the cost of the service. Once processed, the adjudication system 304 returns a claim response 303 to the provider 302. As described in connection with FIG. 2, a post adjudication system 309 can also receive the claim response electronically, including the types of data elements described above and/or with additional data elements such as, for example, an amount covered for the service by the plan carrier. As shown in the embodiment of FIG. 3, the claim response is received at a claim input interface 306. As one of ordinary skill in the art will appreciate upon reading this disclosure, a claim input interface can include hardware, software, firmware and/or some combination thereof to receive claims and batch them together for further processing. For example, the system 309 can receive HIPAA compliant claim responses as an electronic stream of data and batch them together for further processing. However, embodiments of the invention are not limited to this example of a claim input interface. Likewise, the embodiments are not limited to the example of receiving and processing HIPAA compliant claim responses.

FIG. 3, further illustrates an external system 310 which can include a third party system which is not tinder business rules of a particular health care plan. The third party system may submit a paper, or electronic, explanation of benefits (EOB) detailing a particular service performed to a TPA 312 of a given employer or health care plan provider. As shown in FIG. 3, such a TPA claims administrator can additionally submit claims to the claim input 306 of the post adjudication system 309. EOBs can be entered via this interface directly from paper statement output of an external adjudication system 310.

Also, embodiments can include a member, e.g., employee, shown as 314 submitting an electronic or paper receipt for a claim detailing a particular service performed to a TPA 316 of a given employer or health care plan provider. Again, such a TPA claims administrator 316 can additionally submit claims to the claim input 306 of the post adjudication system 309. Embodiments of the invention are not, however, limited to these examples.

The embodiment of FIG. 3 illustrates that the claim input interface 306 can provide the claim response to an eligibility program 317. As one of ordinary skill in the art will appreciate upon reading this disclosure, an eligibility program can check the eligibility of a member or entity, for who a claim is being submitted, as against a list of members in an insurance plan and/or a sponsor plan. As shown in the embodiment of FIG. 3, eligible claims can be provided to a post adjudication program 318 such as can reside on the application server 210-1 described in connection with FIG. 2. The post adjudication program 318 implements post-adjudicated claim rule sets. The post-adjudicated claim rule sets can be implemented through hardware, software, firmware, or a combination thereof. Embodiments of the invention are not so limited and some embodiments are performed manually as well. As mentioned above, the post-adjudicated claim rule sets implemented in a program allow a plan sponsor to establish additional rules sets, e.g., after insurance rule sets, as to the manner in which certain benefit accounts of a plan member are utilized in connection with an exercise of a health care benefit. As described in more detail below, a user having approved access rights can input these additional rule sets to a program in the system 309. Such a user can input the additional rules sets from a remote device, e.g., remote device 104-1 in FIG. 1, through a user interface, such as a keyboard, touch screen display, voice recognition software, Wi-Fi connection, or other input mechanism. Embodiments of the invention are not limited to these examples.

The embodiment of FIG. 3 illustrates that once the post-adjudicated claim rule sets have been performed on a claim response the claim can be sent to a payment output program 320. The payment output program 320 can analyze the data it receives from the post-adjudication program 318 to implement payment instructions such as can be forward to a bank 328 or other account. As shown in the embodiment of FIG. 3, the payment output program, operating on the data from the post-adjudication program can receive input and access one or more member accounts, e.g., 322-1, . . . , 322-N, one or more plan sponsor accounts shown as 324, and other accounts shown as 326. By way of example and not by way of limitation, the one or more member accounts, 322-1, . . . , 322-N can include a member FSA account 322, a bank checking account, a member HRA account 324, etc., to name a few. Embodiments of the invention, however, are not limited to these examples. Accounts do not have to be tax qualified accounts.

As described herein, a member flexible spending account (FSA) account 322 can include funds contributed by a member, e.g, an employee in an organization. Generally, a member can contribute funds annually to a FSA on a pre-tax basis and then apply those funds to certain benefits. A member health reimbursement arrangement (HRA) account 324 can include funds, contributed by a plan sponsor, e.g., an employer organization, on the member's, e.g., employee's, behalf. According to the various program embodiments described herein a plan sponsor can then establish a set or set of business, or benefit, rules governing the members use and application of these finds to various benefits or services. In this manner, a plan sponsor can architect an added mutual benefit for both the member and the sponsor. For example, a plan sponsor can increase the member related deductible levels for various benefits or types of services in order to reduce premium costs, but then can offset the impact to the member by contributing additional funds to a member's HRA for use in paying the higher deductible levels. The higher deductible levels may reduce the overall premium cost that the employer must pay on behalf of its employees, e.g., plan members. However, as described in more detail below, the employer can define mutually favorable business rules for sharing the handling of the higher member deductible levels. HRAs have received treatment guidance from Private Letter Rulings by the Internal Revenue Service. Unlike the annual use or forfeit regulations of a member's FSA, the member may accumulate and retain the funds in their HRA from year to year according to the business rules defined by the plan sponsor. With the member having more autonomy, options, and retention rights over the use of the funds in their HRA, a member may be more selective in the manner and election of how and when they tap into those funds. As a result a member may choose to apply such funds less frequently for provider services. This can in turn drive down overall health care costs. Embodiments are not limited to the above description and use of HRAs and FSAs.

As shown in the embodiment of FIG. 3, the post adjudication system 309 can include a report module 330. The report module 330 includes programs which can operate on the data received from the post-adjudication program 318 and the payment output program 320 to provide information, electronically or otherwise, to a member 332 and/or a plan sponsor 334. Thus, an individual, e.g., member or sponsor with appropriate access rights can receive transaction reports, explanation or benefit (EOB) reports, and view balances in their various benefit accounts.

Figure 4:
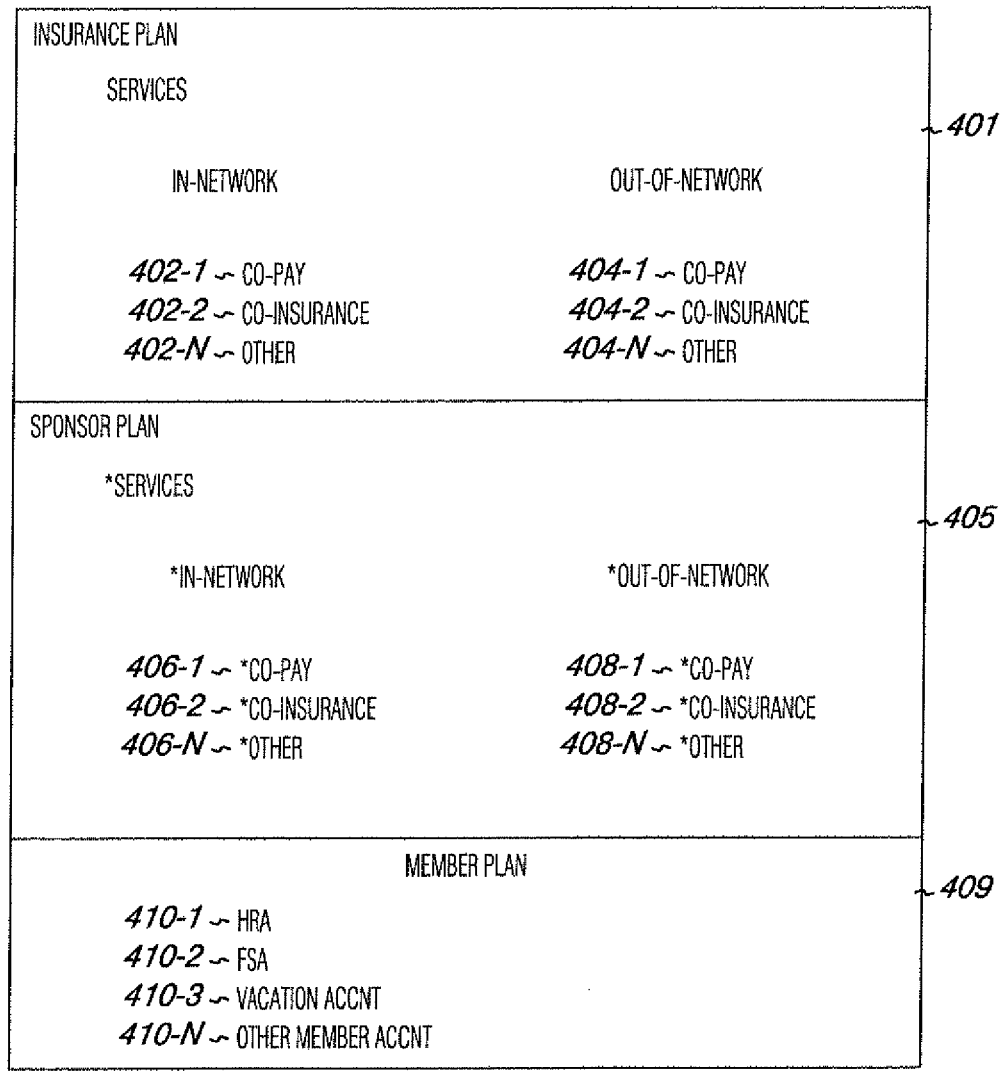
FIG. 4 is an embodiment illustrating a hierarchy of the manner in which business rule sets can be cascaded down from a plan carrier to a plan sponsor to a member.

FIG. 4 is an embodiment illustrating a hierarchy of the manner in which business rule sets can be cascaded down from an insurance plan to a sponsor plan to a member plan. As mentioned above, rule sets can be cascaded down from a plan carrier, e.g., insurer, to a plan sponsor, e.g., employer, to a plan member, e.g., employee. The embodiment of FIG. 4 illustrates at 401 an insurance plan to provide insurance coverage from an insurer such as can be offered to plan sponsors. The plan can include rules and coverage definitions for a number of different types of services. The plan sponsors, e.g., employers, can typically select from among a number of different plans offered by a plan carrier in order to provide different coverage benefits for different types of services to its members, e.g., employees. Section 401 is provided to illustrate that the insurance plan rules are defined by the plan carrier based on a given plan structure selected by a sponsor. As described in the introduction a given plan structure will have associated premium payment levels and an associated set of benefit rules and coverage definitions defined according to the terms of the plan.

As illustrated in the insurance plan, e.g., section 401, services such as health care services can be performed by providers who have been categorized or defined by the plan carrier as either In-Network providers or Out-of-Network providers. As will be explained in more detail in connection with FIG. 6, embodiments can include more than one category of In-Network providers. And, as noted above, this can be determined based on the existence or absence of business agreements, and the terms of those agreements between the plan carriers and various available providers.

As shown in FIG. 4, within each of these of these categories the plan carrier defines the business rules the plan carrier will offer or provide according to different structured plans. These business rules can include definition of what the plan carrier requires for a co-pay both In Network and Out of Network according to different classes or types of services. This is represented in FIG. 4 at 402-1 and 404-1, respectively. The business rules can further include definition of what the plan carrier will provide or chose not to provide in the way of coinsurance both In Network and Out of Network according to different classes or types of services. This is represented in FIG. 4 at 402-2 and 404-2, respectively. The business rules can further include additional definitions of what the plan carrier will provide or chose not to provide in the way of other elections or coverage connected with services, e.g. deductibles or otherwise. This is represented in FIG. 4 at 402-N and 404-N, respectively. Many different plans can be offered by a plan carrier and accordingly the business rule definitions can vary from plan to plan. This difference is often reflected in the cost of the plan, e.g., in required premium levels for the plan, to the plan sponsor. Embodiments of the invention are not limited to these examples.

As shown in FIG. 4, program embodiments of the present invention next allow for a plan sponsor, e.g., employer, to select additional business rules sets to further define a benefits coverage relationship with its members, e.g., employees. This next layer of business rule definition capability is illustrated in section 405 in addition and/or complement to insurance plan rules. The sponsor plan rules can be applied secondary to the insurance plan rules illustrated in 401. However, it is noted that embodiments of the present invention include implementations without an insurance plan. In these embodiments the flow of rule sets can begin with the sponsor plan shown in section 405. The plan sponsor section 405 illustrates that the plan sponsor can select additional business rules sets to further define a benefits coverage relationship with its members, e.g., employees, for a various types of services. In various embodiments, types of services include a preventive care service, a doctor's office visit, a hospital service, an urgent care center service, prescription services, specialized drug therapy services, centers of excellence programs, chemical dependency programs and therapies, dental programs, vision services, and emergency room service, to name a few. In other words the plan sponsor can use the program embodiments to "carve-out" or further define the manner in which certain services are handled in the sponsor's benefits coverage relationship with its members, e.g., employees.

As illustrated in the plan sponsor section, e.g., section 405, services such as health care services can be performed by providers who have been categorized or defined by the plan sponsor as either In-Network providers or Out-of-Network providers. The categorization of In-Network providers or Out-of-Network providers can either be different from or the same as the categorization used by the plan carrier. For example, the selection or definition may be determined based on the existence or absence of business agreements, and the terms of those agreements between the plan sponsor and various available and/or types of service providers, e.g., health care, beauty, travel, and fitness service providers, among others. Embodiments of the invention are not so limited.

By way of example and not by way of limitation, FIG. 4 illustrates that within each of these of these categories the plan sponsor can select additional business rules sets to further define a benefits coverage relationship with its members. As described in more detail below in connection with FIGS. 5-7 the plan sponsor can use program embodiments of the invention to variably select or establish the benefits coverage relationship with its members. And, the plan sponsor can variably select such additional business rules according to any number of classes of services. The plan sponsor can access a program from a remote device, e.g., 104-1 in FIG. 1, to select the plan sponsor rules.

As shown in FIG. 4, these business rules, definable by program embodiments, can include definition of how the plan sponsor will handle various co-pays both In Network and Out of Network according to different classes or types of services. This is represented in FIG. 4 at 406-1 and 408-1, respectively. The business rules, definable by program embodiments, can further include definition of how the plan sponsor will handle various coinsurance both In Network and Out of Network according to different classes or types of services. This is represented in FIG. 4 at 406-2 and 408-2, respectively. The business rules, definable by program embodiments, can further include additional definitions of how the plan sponsor will handle various other elections or coverage connected with services, e.g. deductibles or otherwise. This is represented in FIG. 4 at 406-N and 408-N, respectively. Many different business rules, definable by program embodiments, can be established between the plan sponsor and the member to create an added layer to the benefits coverage relationship in section 405. Embodiments of the invention are not limited to these examples.

As shown in FIG. 4, program embodiments of the present invention next allow for a plan member, e.g., employee, to select additional member rules to further define how the member will apply various benefit coverage funds as permitted by the plan sponsor. That is, the plan sponsor can allow a member to have certain flexibility in the manner in which benefit coverage funds are applied to certain services when such decisions are not already defined according to either the plan sponsor rules or the plan carrier rules.

This next layer of member rule definition capability is illustrated in section 409. The available member rule definition capability in section 405 can vary from service type to service type. In certain service classes a member rule section may not be available or provided. For example, all of the benefit or business rules for certain types of service may be dictated or controlled by the plan sponsor rules and/or plan carrier rules.

As illustrated by example in 409, for certain permitted classes of service a member may select the manner in which benefit coverage funds are applied to certain services from among different benefit coverage accounts. By way of example and not by way of limitation, the member may select a particular account and/or order, e.g., hierarchy, of accounts from which to apply benefit coverage funds for certain services. For example, where permitted the member may chose from which type of account, e.g. a health reimbursement account (HRA) 410-1, a flex spending account (FSA) 410-2, a vacation account 410-2, or another particular member account 410-N, e.g., personal member bank account or otherwise, from which to apply benefit coverage funds for various services.

As member can use program embodiments of the invention to variably select or establish the member rules. That is, when permitted, a member can access a program from a remote device, e.g., 104-1 in FIG. 1, to select the member they chose for the application of benefit coverage funds to certain services.

Program embodiments of the present invention, as illustrated by examples in FIGS. 5-8E, facilitate an effective manner for a plan sponsor to track and administer the benefits coverage relationship with its members despite the addition of another layer of business rules sets. And, program embodiments facilitate an effective manner for a plan member to track benefit coverage funds in various member accounts and apply benefit coverage funds therefrom according to member rules when permitted for certain services.

FIG. 5 is an embodiment representing a plan sponsor interaction with program embodiments for creating an additional, definable set of benefit rules for benefits management. The embodiment of FIG. 5 illustrates one embodiment for implementing a set of post adjudicated claim benefit rules relating to a non-carrier claim category, as the same has been described above. The illustration provided in FIG. 5 can include any suitable graphical user interface (GUI) such as can be presented to a user such as on a display. For example, the illustration in FIG. 5 can include a screen display which a plan sponsor can access, e.g., through a remote device, to implement a set of post adjudicated claim benefit rules by selecting certain fields, e.g., 502 and 506, and/or inputting data such as percentage and dollar values, e.g., 504 and 508. Embodiments of the invention, however, are not limited to these examples.

As shown in the embodiment of FIG. 5, a number of benefit rule selection choices, e.g., 501, 503, 505, and 507, within a particular claim category, e.g., the sponsor claim category shown. In the embodiment of FIG. 5, benefit rule selection choice 501 provides a selection capability between a plan sponsor paying a percentage or the sponsor paying a fixed amount of a co-payment ("copay"), as described above, within the particular claim category. The embodiment of FIG. 5 illustrates a selection between these choices as a selection between input fields 502 and 506. The embodiment of FIG. 5 illustrates that user, e.g., plan sponsor, has selected to pay a percentage of the copay. This is indicated in the drawing by a darkened circle in field 502. Again, FIG. 5 is provided as an example and embodiments are not limited to a particular set or layout presentation for making selections between benefit rule selection choices, or options, on a particular user interface. Various configurations for the type of options or benefit rule selection choices pertaining to benefit rules governing post adjudicated claims are considered within the scope of the present invention.

As shown in the embodiment of Figure, because the user, e.g., plan sponsor or other entity, has selected to pay a percentage of the copay, the user can additionally enter a percentage value in field 504 to reflect a chosen percentage amount. In this example, a percentage value of 50% is reflected in field 504. In the illustration of this embodiment, a user could equally have selected to pays a fixed amount of the copay and this could have been reflected by a darkened circle in field 506. If the user chooses to pay a fixed amount of the copay the user can enter a currency value in field 508. For illustration purposes, a currency value of $45 US dollars is shown entered in field 508.

In the embodiment of FIG. 5, benefit rule selection choice 503 pertains to member account rules associated with the copay of a non-carrier claim category. These member account rules can be separately created for various particular member account types as described herein or otherwise. For example, the member account rules can be independently established for a member FSA account, shown as 322 in FIG. 3, or a member HRA account, shown as 324 in FIG. 3. Embodiments of the invention are not so limited. In the embodiment of FIG. 5, benefit rule selection choice 503 provides a selection capability between example member account categories such as an IRA account, a FSA account, or a member out of pocket selection each having an associated field for selection between a sponsor rule, e.g., 510, 514 and 518, or a member rule, e.g., 512, 516, and 520. In this example the user, e.g., plan sponsor or other entity, has selected a sponsor rule, as indicated by the darkened circle in field 510 and 514, for the HRA and the FSA accounts. And, the user has selected a member rule, as indicated by the darkened circle in field 520, for the member out of pocket selection.

As used herein, a sponsor rule indicates that the plan sponsor, or other third party entity, has governing control of the business rules for application or use of funds in the particular account. Similarly, a member rule indicates that the member has governing control of the business rules for application or use of funds from the particular account type.

The embodiment of FIG. 5 further illustrates that a number of numerical values, ranking, or hierarchy of some other form, can be provided to the definable set of benefit rules for benefits management. These values are illustrated in the embodiment of FIG. 5 in fields 522, 524 and 526. In this example a value of "2" has been entered in field 522, a value of "4" has been entered in field 524, and a value of "6" has been entered in field 526. As mentioned, these values can be used to establish a ranking or hierarchy. Thus, the value "2" in the example of FIG. 5 is the lowest value number and can be used to indicate that funds to be applied to a non-carrier claim category are first to come from, or that the program will first look to the available funds, in a member's HRA account according to a sponsor defined rule. In the example of FIG. 5 the value "4" in field 524 is the next lowest value number and thus can be used to indicate that funds to be applied to a non-carrier claim category are to come next from, or that the program will next look to the available funds, in the member's FSA account, again in this example according to a sponsor defined rule. The value "6" in field 526 the next lowest value number and thus can be used to indicate that funds to be applied to a non-carrier claim category are to come next from, or that the program will next look to the available funds, in a member out of pocket category.

As illustrated in the example of FIG. 5, the use of spaced numerical values allows the plan sponsor to revisit a particular ordering of the account usage in the benefit rules and adjust or change the definable set of benefits rules for benefits management without having to re-rank or re-shuffle the hierarchy of each account ranking value. For example, with the HRA account defined by a ranking value of "2" in field 522 the plan sponsor can reestablish the order in which the various accounts are turned to or accessed by assigning a new value of "1" to the FSA account in field 524. The program would then look first to the available funds in the FSA account, next to the HRA account, and third, in this example, to the member out of pocket category.

As another example, the plan sponsor can leave the ranking value of "6" in field 526 in the member out of pocket category and can reestablish the order in which the various accounts are turned to or accessed by assigning a new value of "8" to the HRA account in field 522 and a new value of "10" to the FSA account in field 524. The program would then took first to the available funds in the member out of pocket account, next to the HRA account, and third, in this example, to the FSA account. Embodiments of the invention are not limited to these examples. Upon reading this disclosure, one will appreciate that this reordering technique provides an ease of management and administration for the system user.

According to the embodiments described herein, the order in which accounts are depleted is determined by the sequence numbers, e.g., 2, 4, 1, etc. The sequence numbers can be first established by a plan sponsor before and/or to the exclusion of the ability to do so by a plan member. If the plan sponsor wishes to delegate control of portions of the account depletion sequence, the plan sponsor can do so by activating (e.g., by clicking a radio button as known among selection interfaces) a field associated with a member rule of a certain account and leaving numerical spaces or not leaving numerical spaces in the numeric order of the accounts remaining among the "hierarchy" fields under the plan sponsor control, e.g., labeled sponsor rule. This is indicated, for example, by the numerical spacing between the numbers "2" and "4". According to various embodiments, when a member views the interface such as via the display of a remote device, the member will only be allowed to edit sequence numbers for accounts that have been marked "member rule" by the sponsor. In one example, members cannot activate a field (e.g., by clicking a radio button as known among selection interfaces) associated with the selection of the sponsor rule or member rule delegation. These can be reserved for plan sponsor access only.

In this manner, a plan sponsor can delegate varying amounts of control and options to a member according to the plan sponsor's choice. This logic is a general solution and may apply to "N" accounts. As one of ordinary skill in the art will appreciate upon reading this disclosure, there may variations on this example of control delegation. Embodiments of the invention are not limited to this interface example of customized delegation.

In the embodiment of FIG. 5, benefit rule selection choice 505 provides a selection capability between a plan sponsor paying a percentage or the sponsor paying a fixed amount of a co-insurance ("co-ins"), as described above, within the particular claim category, e.g., in a non-carrier claim category in this example. The embodiment of FIG. 5 illustrates a selection between these choices as a selection between input fields 528 and 532. The embodiment of FIG. 5 illustrates that user, e.g., plan sponsor, has selected to pay a percentage of the co-ins. This is indicated in the drawing by a darkened circle in field 528. Again, FIG. 5 is provided as an example and embodiments are not limited to a particular set or layout presentation for making selections between benefit rule selection choices, or options, on a particular user interface. Various configurations for the type of options or benefit rule selection choices pertaining to benefit rules governing post adjudicated claims are considered within the scope of the present invention.

As shown in the embodiment of FIG. 5, because the user, e.g., plan sponsor or other entity, has selected to pay a percentage of the co-ins, the user can additionally enter a percentage value in field 530 to reflect a chosen percentage amount. In this example, a percentage value of 50% is reflected in field 530. In the illustration of this embodiment, a user could equally have selected to pays a fixed amount of the co-ins and this could have been reflected by a darkened circle in field 532. If the user chooses to pay a fixed amount of the co-ins the user can enter a currency value in field 534. For illustration purposes, a currency value of $45 US dollars is shown entered in field 534.

In the embodiment of FIG. 5, benefit rule selection choice 507 pertains to member account rules associated with the co-ins of a non-carrier claim category. These member account rules can be separately created for various particular member account types as described herein or otherwise. For example, the member account rules can be independently established for a member FSA account, shown as 322 in FIG. 3, or a member HRA account, shown as 324 in FIG. 3. Embodiments of the invention are not so limited. In the embodiment of FIG. 5, benefit rule selection choice 507 provides a selection capability between example member account categories such as an HRA account, a FSA account, or a member out of pocket selection each having an associated field for selection, or definition, between the particular account as being governed by a sponsor rule, e.g., 536, 540 and 544, or a member rule, e.g., 538, 542, and 546. In this example the user, e.g., plan sponsor or other entity, has selected a sponsor rule, as indicated by the darkened circle in field 536 and 540, for the HRA and the FSA accounts. And, the user has selected a member rule, as indicated by the darkened circle in field 546, for the member out of pocket account.

As was the case above in connection with the member account rules associated with the copay, the embodiment of FIG. 5 allows for a number of numerical values, ranking, or other hierarchy, to be provided as part of the definable set of benefit rules for benefits management. These values are illustrated for the member account rules associated with the co-ins in fields 546, 550 and 552. In this example a value of "2" has been entered in field 546, a value of "4" has been entered in field 550, and a value of "6" has been entered in field 552. These values can serve the same purpose and offer the same flexibility and administrative reordering as described above in connection with the member account rules for the copay.

FIG. 6 is another embodiment representing a definable set of benefit rules for benefits management. As with the illustration in FIG. 5, the illustration in FIG. 6 can include any suitable graphical user interface (GUI) such as can be presented to a user such as on a display. For example, the illustration in FIG. 6 can include a screen display which a plan sponsor can access, e.g., through a remote client/device (such as shown in FIG. 1), to implement a set of benefit rules by selecting certain fields. As mentioned previously, according to the various embodiments rule sets can be cascaded down from the plan carrier, e.g. "insurance category" shown as 600-1 in FIG. 6, to the plan sponsor, e.g. "sponsor rules" 600-2 in FIG. 6, to even "member rules" (not shown). Embodiments of the invention are not so limited.

In the example embodiment of FIG. 6, the insurance category 600-1 illustrates selectable carrier rules for insurance (after copay) for both In Network and Out of Network providers, as the same have been described above. As shown in the embodiment of FIG. 6, any number of different In-Network provider categories, 601-1, . . . , 601-N, can be included among the program embodiments of the present invention. For ease of illustration, detail discussion is provided only to In-Network provider category 601-N in FIG. 6. However, similar rule selections can be made to the additional In-Network provider categories, e.g., 601-N. For example, a different In-Network provider, e.g., 601-N, can include particular selections to the business rules in recognition that the particular In-Network provider category is renown for a particular class of service, e.g., cancer treatment at the Mayo Clinic, or cardiovascular health services at the Cleveland Heart Clinic or at Johns Hopkins University Medical Hospital. Embodiments of the invention are not so limited.

As shown in the FIG. 6 example, for each type of provider the carrier rules can include a carrier percent after copay, a copay amount, an after deductible designation, and a maximum out of pocket payment amount. Thus, for the In Network provider category a field, e.g., 602, 606, 610 and 614, is associated with each of these selectable carrier rules. Likewise, for the Out of Network provider category a field, e.g., 604, 608, and 612, is similarly associated with each of these selectable carrier rules.

By way of example and not by way of limitation, a percentage of 80% is illustrated in field 602 for the carrier percentage after copay for In Network providers and 50% is illustrated in field 604 for the carrier percentage after copay for Out of Network providers. In the example, a dollar amount of $15 is illustrated in field 606 for the copay amount for In Network providers and a dollar amount of $40 is illustrated in field 608 for Out of Network providers. In the example, a designation of NO is illustrated in field 610 for the after deductible designation for In Network providers and a designation of YES is illustrated in field 612 for the after deductible designation for Out of Network providers. Continuing, a maximum annual member payment amount of $5000 is illustrated in field 614 for In Network and no maximum annual member payment amount is provided for Out of Network. All of this data can be input into the program embodiments described herein using a remote client/device connected over a system network, e.g., wireless, hardwired, or a combination thereof. Embodiments of the invention are not limited to the examples provided above.

In the example embodiment of FIG. 6, the sponsor rules shown as post-adjudication rules 600-2 illustrates selectable sponsor rules for insurance (after copay) for both in Network and Out of Network providers. As shown in this example, for each type of provider benefit rule selection choices, e.g., 601, 603, 605, and 607, within a particular claim category, e.g., carrier claim category shown, can be selectable chosen. In the embodiment of FIG. 6, benefit rule selection choice 601 provides a selection capability between a plan sponsor paying a percentage or the sponsor paying a fixed amount of a co-payment ("copay") within the carrier claim category. The embodiment of FIG. 6 illustrates a selection between these choices as a selection between input fields 616, 624 and 620, 628 respectively. The embodiment of FIG. 6 illustrates that a user, e.g., plan sponsor, has selected to pay a percentage of the copay, as indicated by a darkened circle in field 616, for In Network providers. And, for Out of Network providers the plan sponsor has selected not to pay any amount of the copay, as indicated by the unfilled circles.

Again, FIG. 6 is provided as an example and embodiments are not limited to a particular set or layout presentation for making selections between benefit rule selection choices, or options, on a particular user interface. Various configurations for the type of options or benefit rule selection choices pertaining to benefit rules governing post adjudicated claims are considered within the scope of the present invention.

As shown in the embodiment of FIG. 6, because the user, e.g., plan sponsor or other entity, has selected to pay a percentage of the copay In Network, the user can additionally enter a percentage value in field 618 to reflect a chosen percentage amount. In this example, a percentage value of 50% is reflected in field 618. In the illustration of this embodiment, a user could equally have selected to pays a fixed amount of the copay In Network and this could have been reflected by a darkened circle in field 624. In the illustration of this embodiment, a user could equally have selected to pay a percentage value of the copay Out of Network if the user had done so this could have been reflected by a darkened circle in field 620. If the user selects this option the user can additionally enter a percentage value in field 622 to reflect a chosen percentage amount, e.g., illustrated by way of example as 50%.

If the user had selected a fixed amount of the copay In Network and/or Out of Network this could have been reflected by a darkened circle in fields 624 and/or 628. If the user chooses to pay a fixed amount of the copay In Network, or Out of Network, the user can enter a currency value in fields 626 and 630 respectively. For illustration purposes, a currency value of $45 US dollars is shown entered in fields 626 and 630. Embodiments of the invention, however, are not limited to these examples.

In the embodiment of FIG. 6, benefit rule selection choice 603 pertains to member account rules associated with the copay of a carrier claim category. These member account rules can be separately created for various particular member account types as described herein or otherwise. For example, the member account rules can be independently established for a member FSA account, shown as 322 in FIG. 3, or a member HRA account, shown as 324 in FIG. 3. Embodiments of the invention are not so limited. In the embodiment of FIG. 6, benefit rule selection choice 603 provides a selection capability between example member account categories such as an HRA account, a FSA account, or a member out of pocket selection each having an associated field for selection between a sponsor rule and member rule for both In Network and Out of Network providers. In the embodiment of FIG. 6 this as shown as In Network sponsor rules, e.g., 631, 635 and 639, and In Network member rules, e.g., 632, 636, and 640. In the embodiment of For Out of Network this is illustrated as sponsor rules, e.g., 633, 637 and 641, and member rules, e.g., 634, 638, and 642.

The embodiment of FIG. 6 further illustrates that a number of numerical values, ranking, or other hierarchy, can be provided to the definable set of benefit rules for benefits management, as the same has been described in connection with FIG. 4. These values are illustrated in the embodiment of FIG. 6 in fields 643, 644, and 645 for In Network and in fields 646, 647, and 648 for Out of Network. Again, upon reading this disclosure, one will appreciate that this reordering technique provides an ease of management and administration for the system user.

In the embodiment of FIG. 6, benefit rule selection choice 605 provides a selection capability between a plan sponsor paying a percentage or the sponsor paying a fixed amount of a co-insurance ("co-ins") within the particular claim category, e.g., carrier claim category in this example. The embodiment of FIG. 6 illustrates a selection between these choices as a selection between input fields 650 and 658 In Network and fields 654 and 662 Out of Network. The example of FIG. 6 illustrates that a plan sponsor has selected to pay a fixed amount of the co-ins In Network. This is indicated in the drawing by a darkened circle in field 658. FIG. 6 is provided as an example and embodiments are not limited to a particular set or layout presentation for making selections between benefit rule selection choices, or options, on a particular user interface. Various configurations for the type of options or benefit rule selection choices pertaining to benefit rules governing post adjudicated claims are considered within the scope of the present invention.

Because the user, e.g., plan sponsor or other entity, has selected to pay a fixed amount of the co-ins In Network, the user can additionally enter value in field 660 to reflect a chosen currency amount. In this example, a fixed value of $100 is reflected in field 660. Percentage values or fixed amount values can likewise be provided to fields 652, 656, and 664 based on selections made by a user in fields 650 and 658, e.g., In Network, and fields 654 and 662, e.g., Out of Network.

In the embodiment of FIG. 6, benefit rule selection choice 607 pertains to member account rules associated with the co-ins of a carrier claim category. As with the example in FIG. 4, benefit rule selection choice 607 provides a selection capability between example member account categories such as an HRA account, a FSA account, or a member out of pocket selection each having an associated field for selection, or definition, between the particular account as being governed by a sponsor rule, e.g., 671, 675 and 679 In Network or 673, 677, and 681 Out of Network, or a member rule, e.g., 672, 676, and 680 In Network or 674, 678, and 682 Out of Network. In this example the user, e.g., plan sponsor or other entity, has selected a sponsor rule In Network and Out of Network, as indicated by the darkened circle in fields 671, 675 and 673, 677 respectively, for the HRA and the FSA accounts. And, the user has selected a member rule In Network and Out of Network, as indicated by the darkened circle in fields 680 and 682 respectively, for the member out of pocket account.

As described above, the embodiment of FIG. 6 allows for a number of numerical values, ranking, or hierarchy, to be provided as part of the definable set of benefit rules for benefits management. These values are illustrated in the embodiment of FIG. 6 in fields 683, 684, and 685 for In Network and in fields 686, 687, and 688 for Out of Network. In this manner, an ease of management and administration for the reordering the system is afforded to the user.

Figure 7:
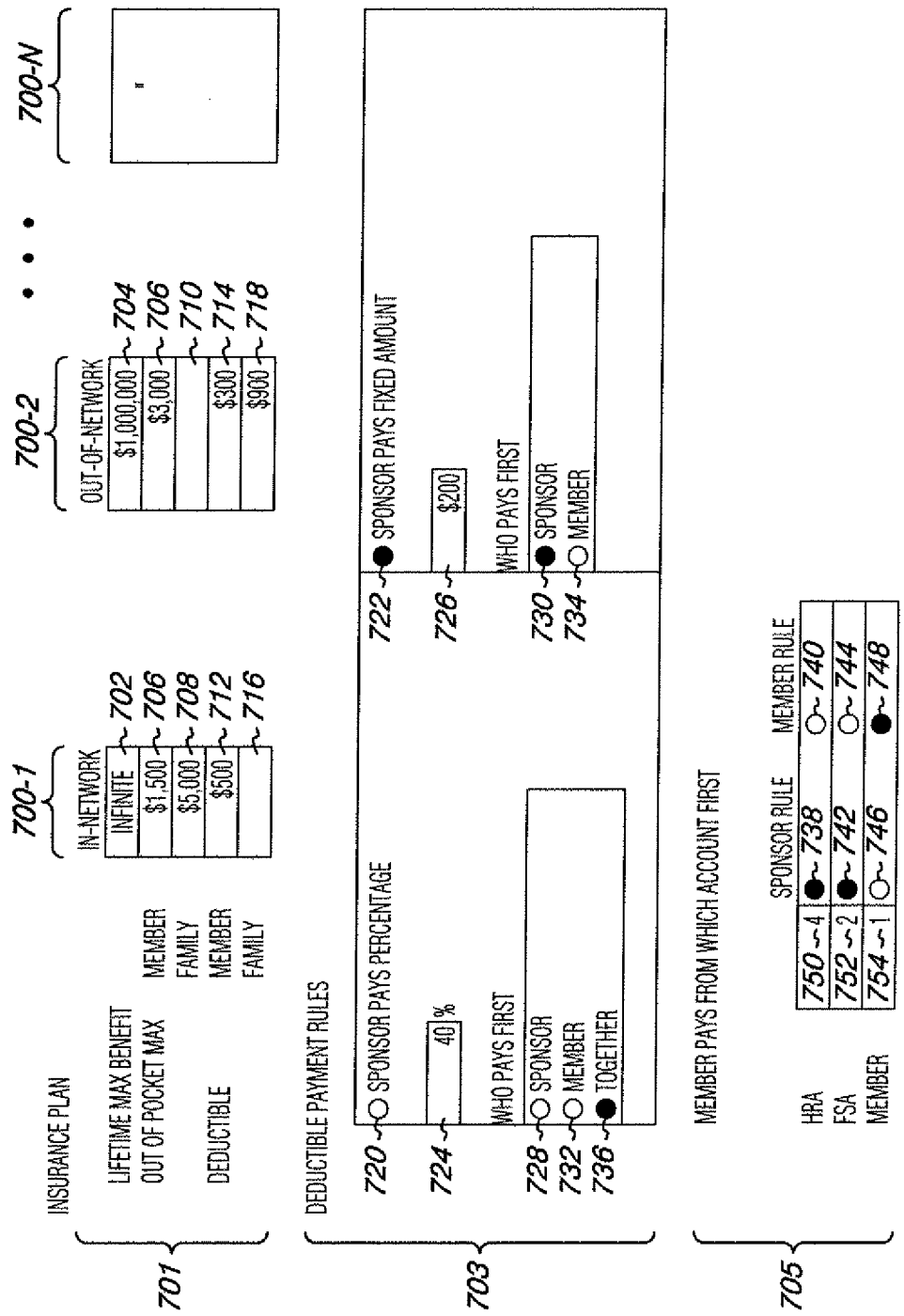
FIG. 7 is another embodiment representing a definable set of benefit rules for benefits management.

FIG. 7 is another embodiment representing a definable set of benefit rules for benefits management. As described in FIGS. 5 and 6, FIG. 7 can represent a user interface through with a user can input selections for one or more benefit rules for benefits management whether through a remote device/client or otherwise. FIG. 7 illustrates a carrier claim category 701 which provides selectable carrier rules for a lifetime maximum benefit selection, an out of pocket maximum amount selection for both member and family, as well as a deductible amount for both member and family as handled for In Network and Out of Network providers. For the In Network provider category a field, e.g., 702, 706, 708, 712, and 716, is associated with each of these selectable carrier rules. Likewise, for the Out of Network provider category a field, e.g., 704, 707, 710, 714 and 718, is similarly associated with each of these selectable carrier rules.

In this example an "infinite" selection is illustrated as having been chosen in field 702 for In Network providers and $1,000,000 is illustrated as having been chosen in field 704 for Out of Network providers. In the example, a dollar amount of $1,500 is illustrated as having been chosen in field 706 for member Out of pocket maximum amount selection for In Network providers and a dollar amount of $3,000 is illustrated in field 707 for Out of Network providers. A dollar amount of $5,000 is illustrated as having been chosen in field 708 for family out of pocket maximum amount selection for In Network providers and no dollar amount is illustrated as being offered in field 710 for Out of Network providers. Further, no dollar amount of $1,500 is illustrated as being offered in fields 712 and 716 for member or family deductible amounts for In Network providers. A $300 member deductible amount is illustrated as having been chosen in field 714 for Out of Network providers and a $900 family deductible amount is illustrated as having been chosen in field 718 for Out of Network providers.

In the example embodiment of FIG. 7, deductible payment rules 703 are illustrated with a field for a sponsor to pay a percentage, e.g., field 720, and/or to pay a fixed amount, e.g., field 722. In this example, a darkened circle in field 720 represents a sponsor has chosen to pay a percentage. Based on the field chosen, e.g., field 720 or field 722, a user can input a percentage value, e.g., example 40% shown in field 724, or a currency value, e.g., example $500 shown in field 726. In the embodiment of FIG. 7 the deductible payment rules 703 further include one or more fields for defining who pays first in both the sponsor pays percentage and sponsor pays fixed amount categories. In this example these are illustrated as fields 728, 732, and 736, representing sponsor, member, and together respectively, in the sponsor pays percentage category. In the sponsor pays fixed amount category these are illustrated as fields 730 and 734. Embodiments of the invention are not limited to these examples.

As illustrated in the embodiment of FIG. 7, a category 705 facilitates input selections to determine from which accounts and in what order a member pays as according to whether the event is governed by a sponsor rule or a member rule. In this example, three example accounts are shown, e.g., HRA account, FSA account, and member account. Again embodiments are not limited to these examples. Associated fields for input selection are illustrated as 738, 742, and 746 respectively for the sponsor rule events. Associated fields for input selection of member rule events are illustrated as 740, 744, and 748 respectively. As described previously, ordering of the payment can be selected by inputting numerical values, rankings, or other hierarchy, according to the embodiments described herein, to respective fields 750, 752, and 754. Thus in this example for events governed by member rules the value of "1" is provided in field 754 to indicate that a member pays first from their member account. Further since neither field 740 or 744 is illustrated as having been selected for the other two example accounts, a member can only access the member account for application of funds to events governed by member rules. In this example the events governed by sponsor rules can access the HRA account for application of funds and can access the FSA account for application of funds, e.g., fields 738 and 742 are illustrated as having been chosen. In this example, a value of "4" is provided in field 750 and a value of "2" in field 752 to order to access of funds first from the HRA account and second from the FSA account.

As described earlier, various orderings can be structured according to the direction of the user input and the embodiments are not limited to the examples illustrated in FIG. 7. From reading the embodiments on the example rankings in fields, 750, 752, and 754, however, one will appreciate that the ordering techniques described herein provide for an ease of management and administration for the system user.

FIGS. 8A-8E illustrate an embodiment for adjudication of a benefit claim. FIGS. 8A-8E illustrate an example of the manner in which a claim for a medical service received by a member would be handled according to the business rule examples illustrated in FIGS. 5-7. In this example the claim is one within a covered carrier claim category. Embodiments of the invention are not limited to this illustrative example.

FIGS. 8A-8E a provider is illustrated at block 802. The provider can include a remote device or remote client, shown as 104-1, 104-2, . . . , 104-N, in FIG. 1. The provider 202 can be associated with an entity rendering a health or medical service, e.g., doctors, nurses, hospitals, and health care clinics. However, other providers of other types of services such a fitness, beauty, retirement, salon, and travel service provider, among others are considered within the scope of the present invention.

In FIGS. 8A-8E an exchange is illustrated between the provider 802 and a block containing a plan carrier 804-1, a plan sponsor 804-2, a member FSA 804-3, a member HRA 804-4, a member out of pocket (O.O.P.) account 804-5, and another entity or account 804-N. These entities and/or accounts have been described in detail herein. FIGS. 8A-8E serve to illustrate the application of funds according one particular program configuration in order to satisfy a health care service claim in a benefits management system.

In the example of FIG. 8A, a claim 801 such as an "835" claim is submitted in the amount of $1500 to a plan carrier 804-1. As described above the claim request 801 can also be submitted to a TPA working on behalf of the plan carrier 804-1. The plan carrier 804-1 or TPA can adjudicate the claim according to business rules defined by the plan carrier 804-1 such as described in section 401 of FIG. 4. In this example, the plan carrier 804-1 or TPA sends a claim response 803 indicating that an amount of $728 is covered according to the terms of a health care plan, such as a health care plan maintained by a sponsor, e.g., employer, on behalf of a particular member, e.g., employee, for the particular type of service performed.

Figure 8B:
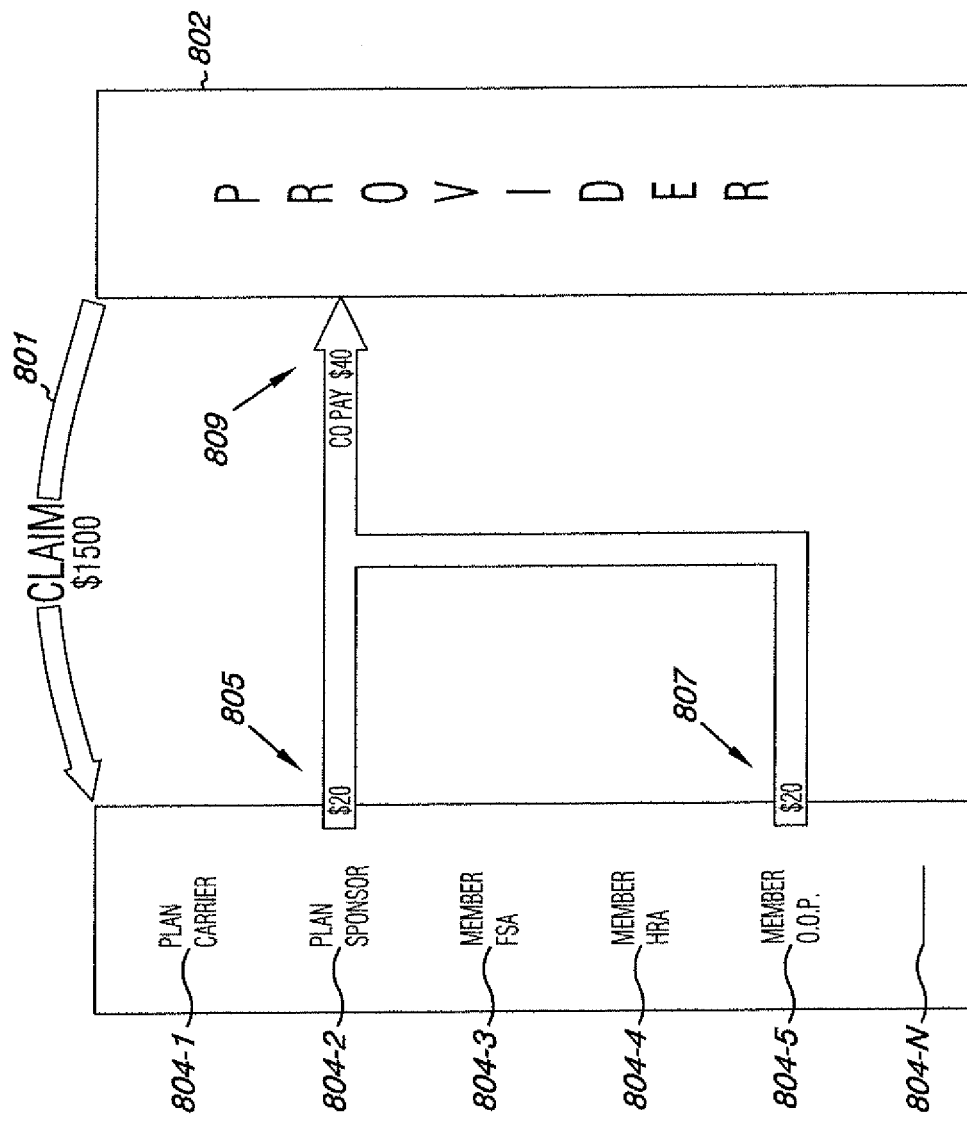

FIG. 8B illustrates that in this example a post adjudication rule has been established which defines that for this particular type of service the plan sponsor will pay 50% of the copay, such as defined in fields 616 and 618 in FIG. 6. In FIG. 8B the copay amount is $40, as shown at 809. FIG. 8B thus reflects that the plan sponsor will pay $20, shown at 805, of the $40 copay amount according to the program selectable business rules shown in FIG. 6. The FIG. 8B example further reflects that either a plan sponsor rule or member rule (e.g., section 405 or section 409 of FIG. 4, respectively) has determined that the remaining $20 of the copay be applied from member out of pocket funds, shown at 807.

Figure 8C:
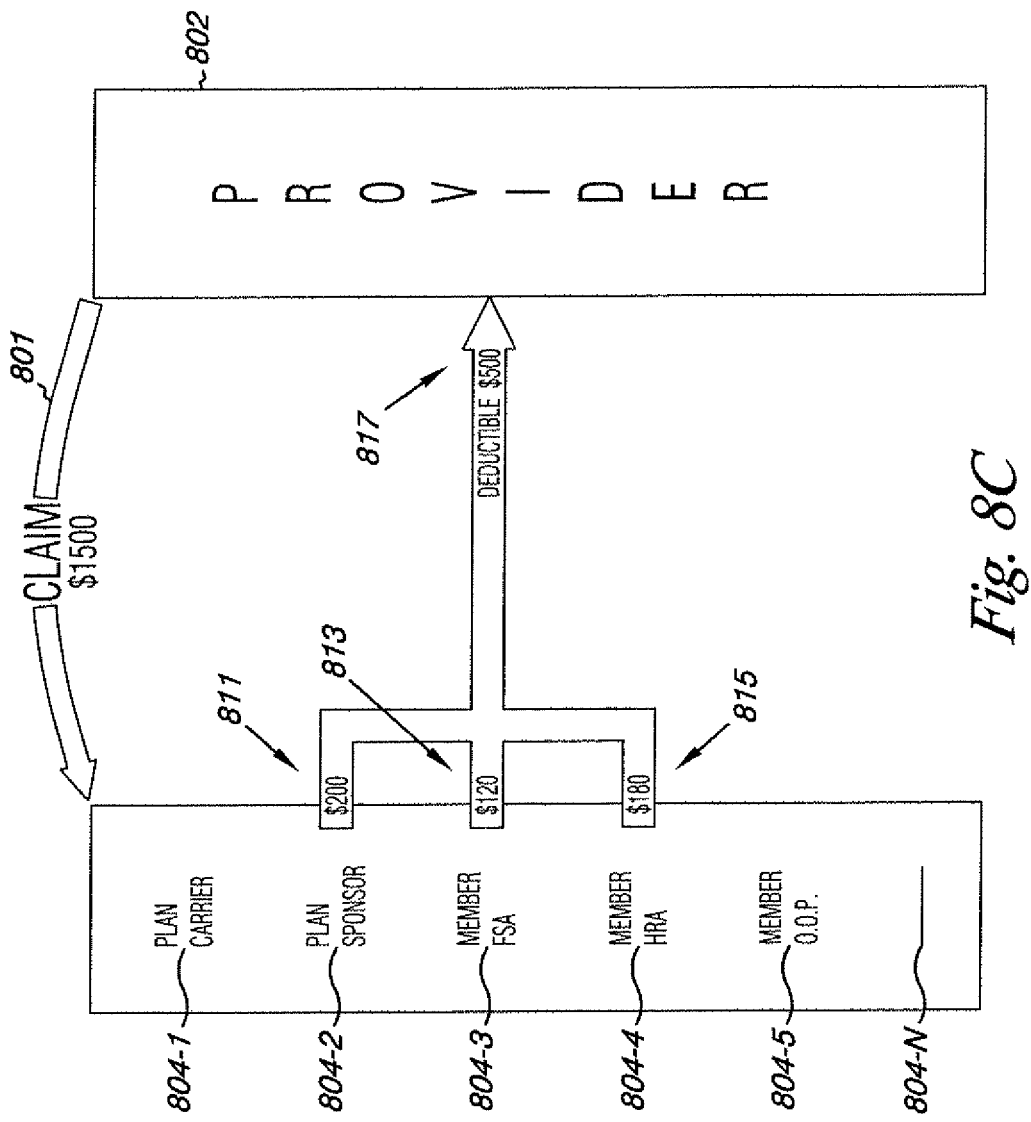

FIG. 8C illustrates the handling of a deductible amount, e.g., $500 shown at 817, associated with the claim for the particular type of service. FIG. 8C illustrates that in this example according to the sponsor rule defined in fields 722, 726, and 730 of FIG. 7, the sponsor will pay the first $200, shown at 811, of the deductible 817 for this particular claim type. The member is responsible for paying the remaining $300. The FIG. 8C example further reflects that either a plan sponsor rule or member rule (e.g., section 405 or section 409 of FIG. 4, respectively) has determined that the remaining $300 of the copay be applied first from the member FSA and then the remaining amounts are to be applied next from the member's HRA account. In the example of FIG. 7, this would accord with the deductible falling under a category of a sponsor rule and follow the selections made in fields 750 and 752. That is field 752 contains a value of "2" and field 750 contains a value of "4" indicating that the remaining funds are to be applied from the FSA before the member HRA. In this example $120, shown at 813, depletes the member FSA and the remaining $180 is applied from the member HRA, shown at 815.

Figure 8D:
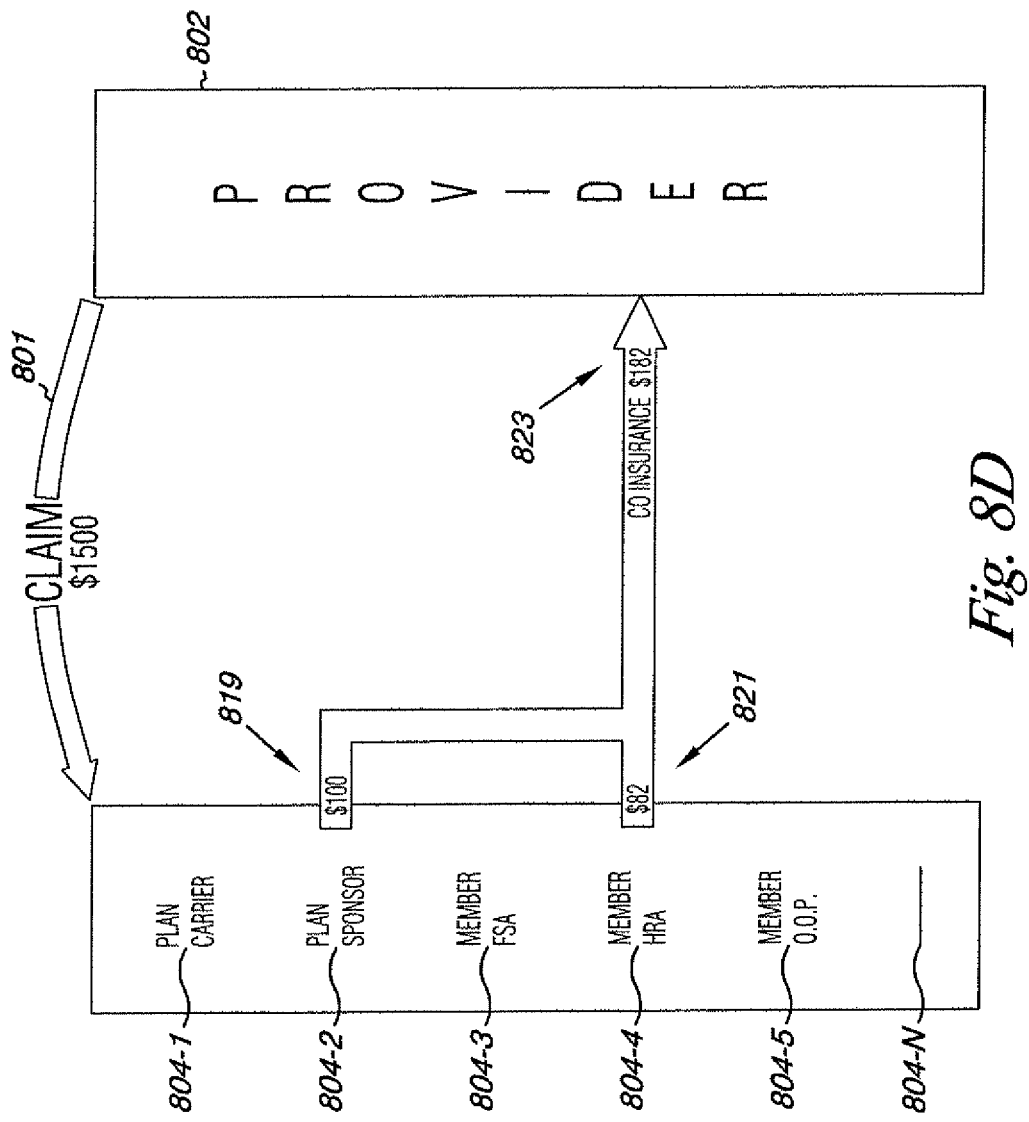

FIG. 8D illustrates the handling of a coinsurance amount, e.g., $182 shown at 823, associated with the claim for the particular type of service. FIG. 8D illustrates that in this example according to the sponsor rule defined in fields 658 and 660 of FIG. 6, the sponsor will pay a fixed amount of $100, shown at 819, of the coinsurance 823 for this particular claim type. The member is responsible for paying the remaining $82. The FIG. 8D example further reflects that either a plan sponsor rule or member rule (e.g., section 405 or section 409 of FIG. 4, respectively) has determined that the remaining member's responsibility for the remaining $82 be applied from the member's HRA account, shown at 821.

FIG. 8E illustrates the handling of an ineligible amount, e.g., the remaining $50 shown at 827, that is due on the $1500 claim 801 for the particular type of service. FIG. 8D illustrates that either a plan sponsor rule or member rule (e.g., section 405 or section 409 of FIG. 4, respectively) has determined that the member is responsible for paying the ineligible amount for the particular claim type. FIG. 8D further illustrates that either a plan sponsor rule or member rule has established that the members responsibility for the $50 ineligible amount be applied from the member's HRA account, shown at 825.

Although specific embodiments have been illustrated and described herein, those of ordinary skill in the art will appreciate that an arrangement calculated to achieve the same techniques can be substituted for the specific embodiments shown. This disclosure is intended to cover adaptations or variations of various embodiments of the invention. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the invention includes other applications in which the above structures and methods are used. Therefore, the scope of various embodiments of the invention should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system for benefits management, comprising:
a server including an application interface and access to a data store having one or more client files, wherein a client file includes system user definable sets of business rule instructions executed by a processor to manage and administer benefits and includes fund use rule instructions executed by a processor to access and apply funds to payment of claims from a plurality of accounts; and
a program operable on the server to apply the system user definable sets of business rules to select a hierarchy for payment from the plurality of accounts,
wherein the instructions are executed by the processor to:
allow a plan sponsor to define a first defined set of the fund use rules in order to define and make electronic payment directly to a first part of a non-carrier claim category portion of an electronically transmitted claim, according to control rights and ranking provided first to the plan sponsor for establishing a first tier of the hierarchy for electronic payment of the first part of the non-carrier claim category portion, from between two or more different employee benefit accounts managed and administered by the plan sponsor, according to the plan sponsor ranking, indicating a numerical ranking, between the two or more different accounts;
allow a plan sponsor to define a second defined set of the fund use rules in order to define and make electronic payment directly to a second part of the non-carrier claim category portion of the electronically transmitted claim, according to control rights and ranking provided first to the plan sponsor for establishing a second tier of the hierarchy for electronic payment of the second part of the non-carrier claim category portion, from between two or more different employee benefit accounts managed and administered by the plan sponsor, according to the plan sponsor ranking, indicating a numerical ranking, between the at least two different accounts;
allow a plan member to define a third defined set of the fund use rules in order to define and make electronic payment directly to a remaining amount of the first part of the non-carrier claim category portion of the electronically transmitted claim, according to control rights and ranking provided second to the plan member as part of the first tier of the hierarchy for further electronic payment of the first part of the non-carrier claim category portion, from between the two or more different employee benefit accounts managed and administered by the plan sponsor, according to the plan member ranking, indicating a numerical ranking, between the two or more different accounts;
allow a plan member to define a fourth defined set of the fund use rules in order to define and make electronic payment directly to a remaining amount of the second part of the non-carrier claim category portion of the electronically transmitted claim, according to control rights and ranking provided second to the plan member as part of the second tier of the hierarchy for further electronic payment of the second part of the non-carrier claim category portion, from between the two or more different employee benefit accounts managed and administered by the plan sponsor, according to the plan member ranking, indicating a numerical ranking, between the two or more different accounts;
receive the electronically transmitted claim;
apply the plan sponsor ranking and the plan member ranking automatically between the two or more accounts to make payment on the first part of the electronically transmitted claim based on the first tier of the hierarchy; and
apply the plan sponsor ranking and the plan member ranking automatically between the two or more accounts to make payment on the second part of the electronically transmitted claim based on the second tier of the hierarchy.

2. The system of claim 1, wherein the at least two different employee benefit accounts are selected from the group of:
a health reimbursement arrangement (HRA) account;
a flex spending account (FSA);
a vacation account;
a fitness club account;
a retiree health benefits account; and
a salon account.

3. The system of claim 1, wherein:
the first part is a co-pay part of the non-carrier claim category portion of the electronically transmitted claim; and
the second part is a co-insurance part of the non-carrier claim category portion of the electronically transmitted claim.

4. The system of claim 1, wherein the one or more client files include plan sponsor files associated with a health care insurance plan.

5. The system of claim 4, wherein the program can track adjudicated claims submitted by a plan member and can apply the definable set of business rules to manage available funds and track payments in a flexible spending account (FSA) and a health reimbursement arrangement (HRA) account secondary to application of a plan carrier's business rules for the health care insurance plan.

6. The system of claim 1, wherein the instructions are executed by the processor to:
allow changes and different definition to the plan sponsor ranking and the plan member ranking between the two or more accounts to establish different first tiers of the hierarchy and different second tiers of the hierarchy between selected categories within particular classes of services; and
automatically apply changes and different definitions according to the different first tiers of the hierarchy and different second tiers of the hierarchy between selected categories within particular classes of services to make payment on the first and the second part of the electronically transmitted claim.

7. The system of claim 6, wherein the selected categories include categories selected from the group of:
an insured category;
a co-insurance category; and
an ineligible category.

8. The system of claim 6, wherein particular classes of services include in-network classes and out-of-network classes for services selected from the group of:
a preventive care service;
an office visit;
a hospital service;
an urgent care center service;

a prescription service;
a dental service;
a vision service;
a chemical dependency service; and
an emergency room service.

9. The system of claim 1, wherein the instructions are executed by the processor to allow and apply a plan sponsor rule
to define and make electronic payment directly to the first part and the second part of a non-carrier claim category portion of the electronically transmitted claim in the form of a percentage payment amount or a fixed payment amount independently among the first part and the second part, and independently among selected categories within particular classes of services.

10. The system of claim 1, wherein the instructions are executed by the processor to:
allow the plan sponsor to delegate control rights and ranking between the plan sponsor and the plan member.

11. The system of claim 1, wherein the one or more client files include one or more member files accessible from a remote device by one or more entities having authorized access rights, the one or more entities selected from the group of:
a plan sponsor;
a plan member; and
a third party administrator.

12. The system of claim 1, wherein each client file is associated with a plan sponsor and wherein the plan sponsor can access its associated client file from a remote device to select among the definable set of business rules.

13. A non-transitory computer readable medium including a program having stored instructions executable by a processor to:
allow a plan sponsor to define a first defined set of the fund use rules in order to define and make electronic payment directly to a first part of a non-carrier claim category portion of an electronically transmitted claim, according to control rights and ranking provided first to the plan sponsor for establishing a first tier of the hierarchy for electronic payment of the first part of the non-carrier claim category portion, from between two or more different employee benefit accounts managed and administered by the plan sponsor, according to the plan sponsor ranking, indicating a numerical ranking, between the two or more different accounts;
allow a plan sponsor to define a second defined set of the fund use rules in order to define and make electronic payment directly to a second part of the non-carrier claim category portion of the electronically transmitted claim, according to control rights and ranking provided first to the plan sponsor for establishing a second tier of the hierarchy for electronic payment of the second part of the non-carrier claim category portion, from between two or more different employee benefit accounts managed and administered by the plan sponsor, according to the plan sponsor ranking, indicating a numerical ranking, between the at least two different accounts;
allow a plan member to define a third defined set of the fund use rules in order to define and make electronic payment directly to a remaining amount of the first part of the non-carrier claim category portion of the electronically transmitted claim, according to control rights and ranking provided second to the plan member as part of the first tier of the hierarchy for further electronic payment of the first part of the non-carrier claim category portion, from between the two or more different employee benefit accounts managed and administered by the plan sponsor, according to the plan member ranking, indicating a numerical ranking, between the two or more different accounts;
allow a plan member to define a fourth defined set of the fund use rules in order to define and make electronic payment directly to a remaining amount of the second part of the non-carrier claim category portion of the electronically transmitted claim, according to control rights and ranking provided second to the plan member as part of the second tier of the hierarchy for further electronic payment of the second part of the non-carrier claim category portion, from between the two or more different employee benefit accounts managed and administered by the plan sponsor, according to the plan member ranking, indicating a numerical ranking, between the two or more different accounts;
receive the electronically transmitted claim;
apply the plan sponsor ranking and the plan member ranking automatically between the two or more accounts to make payment on the first part of the electronically transmitted claim based on the first tier of the hierarchy; and
apply the plan sponsor ranking and the plan member ranking automatically between the two or more accounts to make payment on the second part of the electronically transmitted claim based on the second tier of the hierarchy.

14. The medium of claim 13, wherein defining a number of plan sponsor rules includes selecting a payment relationship between a plan sponsor and a plan member for handling a deductible payment associated with a particular claim type under the health insurance plan.

15. The medium of claim 13, wherein defining a number of plan sponsor rules includes selecting a payment relationship between a plan sponsor and a plan member for handling a co-payment associated with a particular claim type under the health insurance plan.

16. The medium of claim 13, wherein defining a number of plan sponsor rules includes selecting a payment relationship between a plan sponsor and a plan member for handling a coinsurance payment associated with a particular claim type under the health insurance plan.

17. The medium of claim 13, wherein defining a number of plan sponsor rules includes a plan sponsor selecting a hierarchy among a number of plan member health benefit accounts for application of funds to a particular claim type under the health insurance plan.

18. The medium of claim 17, wherein defining a number of member rules includes a plan member selecting a hierarchy among a number of plan member health benefit accounts for application of funds to a particular claim type under the health insurance plan secondary to the number of plan sponsor rules.

19. The medium of claim 13, wherein the method further includes tracking usage and available balances in a number of plan member health benefit accounts according to the number of plan sponsor rules and member rules.

20. A method for providing benefits, comprising:
utilizing a processor and a memory having computer readable instructions stored thereon that are executable on the processor for:
allowing, by a processor, a plan sponsor to define a first defined set of the fund use rules in order to define and make electronic payment directly to a first part of a non-carrier claim category portion of an electronically transmitted claim, according to control rights and ranking provided first to the plan sponsor for establishing a first tier of the hierarchy for electronic payment of the first part of the non-carrier claim category portion, from between two or more different employee benefit accounts managed and administered by the plan sponsor, according to the plan sponsor ranking, indicating a numerical ranking, between the two or more different accounts;

allowing, by a processor, a plan sponsor to define a second defined set of the fund use rules in order to define and make electronic payment directly to a second part of the non-carrier claim category portion of the electronically transmitted claim, according to control rights and ranking provided first to the plan sponsor for establishing a second tier of the hierarchy for electronic payment of the second part of the non-carrier claim category portion, from between two or more different employee benefit accounts managed and administered by the plan sponsor, according to the plan sponsor ranking, indicating a numerical ranking, between the at least two different accounts;

allowing, by a processor, a plan member to define a third defined set of the fund use rules in order to define and make electronic payment directly to a remaining amount of the first part of the non-carrier claim category portion of the electronically transmitted claim, according to control rights and ranking provided second to the plan member as part of the first tier of the hierarchy for further electronic payment of the first part of the non-carrier claim category portion, from between the two or more different employee benefit accounts managed and administered by the plan sponsor, according to the plan member ranking, indicating a numerical ranking, between the two or more different accounts;

allowing, by a processor, a plan member to define a fourth defined set of the fund use rules in order to define and make electronic payment directly to a remaining amount of the second part of the non-carrier claim category portion of the electronically transmitted claim, according to control rights and ranking provided second to the plan member as part of the second tier of the hierarchy for further electronic payment of the second part of the non-carrier claim category portion, from between the two or more different employee benefit accounts managed and administered by the plan sponsor, according to the plan member ranking, indicating a numerical ranking, between the two or more different accounts;

receiving the electronically transmitted claim;

applying the plan sponsor ranking and the plan member ranking automatically between the two or more accounts to make payment on the first part of the electronically transmitted claim based on the first tier of the hierarchy; and applying the plan sponsor ranking and the plan member ranking automatically between the two or more accounts to make payment on the second part of the electronically transmitted claim based on the second tier of the hierarchy.

\* \* \* \* \*